(12) United States Patent
Hijaz et al.

(10) Patent No.: US 10,503,656 B2
(45) Date of Patent: Dec. 10, 2019

(54) PERFORMANCE BY RETAINING HIGH LOCALITY DATA IN HIGHER LEVEL CACHE MEMORY

(71) Applicant: QUALCOMM Incorporated, San Diego, CA (US)

(72) Inventors: Farrukh Hijaz, San Diego, CA (US); George Patsilaras, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/709,884

(22) Filed: Sep. 20, 2017

(65) Prior Publication Data
US 2019/0087345 A1    Mar. 21, 2019

(51) Int. Cl.
| | |
|---|---|
| *G06F 12/00* | (2006.01) |
| *G06F 12/0897* | (2016.01) |
| *G06F 12/0877* | (2016.01) |
| *G06F 12/0891* | (2016.01) |
| *G06F 12/0811* | (2016.01) |
| *G06F 12/126* | (2016.01) |
| *G06F 12/128* | (2016.01) |
| *G06F 11/34* | (2006.01) |

(52) U.S. Cl.
CPC ......... *G06F 12/0897* (2013.01); *G06F 11/34* (2013.01); *G06F 12/0811* (2013.01); *G06F 12/0877* (2013.01); *G06F 12/0891* (2013.01); *G06F 12/126* (2013.01); *G06F 12/128* (2013.01); *G06F 2212/1024* (2013.01); *G06F 2212/1028* (2013.01); *G06F 2212/60* (2013.01)

(58) Field of Classification Search
None
See application file for complete search history.

(56) References Cited

U.S. PATENT DOCUMENTS

| | | | | | |
|---|---|---|---|---|---|
| 5,829,025 | A | * | 10/1998 | Mittal | ................. G06F 9/30047 711/122 |
| 2006/0230235 | A1 | * | 10/2006 | O'Connor | ............. G06F 12/127 711/133 |

* cited by examiner

*Primary Examiner* — Daniel D Tsui
(74) *Attorney, Agent, or Firm* — The Marbury Law Group/Qualcomm

(57) ABSTRACT

Various aspects include methods for implementing retaining high locality data in a higher level cache memory on a computing device. Various aspects may include receiving a cache access request for a first cache line in the higher level cache memory indicating a locality of the first cache line, determining whether the access request indicates high locality, and setting a high locality indicator of the first cache line in response to determining that the cache access request indicates high locality. Various aspects may include determining whether a lower level cache memory hit counter of a first cache line of a first cache exceeds a lower level cache locality threshold, setting a high locality indicator of the first cache line in response to determining that the lower level cache memory hit counter exceeds the lower level cache locality threshold and resetting the lower level cache memory hit counter of the first cache.

15 Claims, 19 Drawing Sheets

PERFORMANCE BY RETAINING HIGH LOCALITY DATA IN HIGHER LEVEL CACHE MEMORY

BACKGROUND

High locality data can be evicted from level 1 (L1) caches due to low locality data thrashing a high locality data set of interest, and due to suboptimal replacement policies, like a random replacement policy. For access of the evicted high locality data, the evicted high locality data need to be brought back to L1 cache, potentially evicting some other cache lines in the process. The high locality data basically cycles through L1 and level 2 (L2) caches. This cycling results in higher access latency as well as more energy and bandwidth being consumed on a computing device.

SUMMARY

Various disclosed aspects may include apparatuses and methods for implementing retaining high locality data in a higher level cache memory on a computing device. Various aspects may include receiving a cache access request for a first cache line in the higher level cache memory indicating a locality of the first cache line, determining whether the access request indicating the locality of the first cache line indicates that the first cache line has high locality, and setting a high locality indicator of the first cache line in the higher level cache memory in response to determining that the cache access request indicates that the first cache line has high locality.

Some aspects may further include selecting the first cache line as a victim cache line candidate, determining whether the high locality indicator of the first cache line is set, evicting the first cache line in response to determining that the high locality indicator of the first cache line is not set, and selecting a second cache line as the victim cache line candidate in response to determining that the high locality indicator of the first cache line is set.

Some aspects may further include determining whether to promote the first cache line to having high locality in response to determining that the access request indicates that the first cache line has high locality, in which setting a high locality indicator of the first cache line in the higher level cache memory may include setting the high locality indicator of the first cache line in the higher level cache memory in response to determining to promote the first cache line to having high locality. Some aspects may further include resetting the high locality indicator of the first cache line in the higher level cache memory in response to determining to not promote the first cache line to having high locality.

Some aspects may further include determining whether promoting the first cache line to having high locality exceeds a cache set promote threshold in response to determining that the access request indicates that the first cache line has high locality, in which setting a high locality indicator of the first cache line in the higher level cache memory may include setting the high locality indicator of the first cache line in the higher level cache memory in response to determining that promoting the first cache line to having high locality does not exceed the cache set promote threshold.

Some aspects may further include resetting a high locality indicator of a second cache line in the higher level cache memory in response to determining that promoting the first cache line to having high locality exceeds the cache set promote threshold.

Some aspects may further include determining whether a high locality counter for the higher level cache memory exceeds a demote threshold, in which resetting a high locality indicator of a second cache line in the higher level cache memory may include resetting the high locality indicator of the second cache line in the higher level cache memory in response to determining that the high locality counter for the higher level cache memory exceeds the demote threshold.

Some aspects may further include determining whether a cache line high locality counter exceeds a cache line demote threshold, and resetting the high locality indicator of the first cache line in the higher level cache memory in response to determining that the cache line high locality counter exceeds a cache line demote threshold.

Some aspects may further include resetting the high locality indicator of the first cache line in the higher level cache memory in response to determining that the cache access request does not indicate the first cache line has high locality.

Various aspects may include apparatuses and methods for implementing retaining high locality data in a higher level cache memory on a computing device. Various aspects may include determining whether a lower level cache memory hit counter of a first cache line of a first cache exceeds a lower level cache locality threshold, setting a high locality indicator of the first cache line in response to determining that the lower level cache memory hit counter of the first cache line exceeds the lower level cache locality threshold, and resetting the lower level cache memory hit counter of the first cache.

Some aspects may further include determining whether promoting the first cache line to having high locality by setting the high locality indicator of the first cache line exceeds a cache set promote threshold, in which setting a high locality indicator of the first cache line may include setting the high locality indicator of the first cache line in response to determining that promoting the first cache line to having high locality does not exceed the cache set promote threshold.

Some aspects may further include sending a set cache line high locality indicator signal for the first cache line, and receiving the set cache line high locality indicator signal for the first cache line, in which resetting the lower level cache memory hit counter of the first cache may include resetting the lower level cache memory hit counter of the first cache in response to receiving the set cache line high locality indicator signal for the first cache line.

Some aspects may further include determining whether the lower level cache memory hit counter of the first cache line exceeds a promote replace threshold in response to determining that promoting the first cache line to having high locality exceeds the cache set promote threshold, in which setting a high locality indicator of the first cache line may include setting the high locality indicator of the first cache line in response to determining that the lower level cache memory hit counter of the first cache line exceeds the promote replace threshold. Some aspects may further include resetting a high locality indicator of a second cache line in response to determining that the lower level cache memory hit counter of the first cache line exceeds the promote replace threshold, and maintaining the high locality indicator of the first cache line in response to determining that the lower level cache memory hit counter of the first cache line does not exceed the promote replace threshold.

Some aspects may further include selecting the first cache line as a victim cache line candidate, determining whether the high locality indicator of the first cache line is set, updating a higher level cache hit counter of the first cache line in response to determining that the high locality indicator of the first cache line is set, and evicting the first cache line in response to determining that the high locality indicator of the first cache line is not set.

Some aspects may further include determining whether the higher level cache hit counter of the first cache line exceeds a replace threshold, and resetting the higher level cache hit counter of the first cache line in response to determining that the higher level cache hit counter of the first cache line exceeds the replace threshold.

Some aspects may further include determining whether a higher level cache hit counter of the first cache line exceeds an update threshold, updating the lower level cache hit counter of the first cache line in response to determining that the higher level cache hit counter of the first cache line exceeds the update threshold, and maintaining the lower level cache hit counter of the first cache line in response to determining that the higher level cache hit counter of the first cache line does not exceed the update threshold.

Some aspects may further include determining whether the high locality indicator of the first cache line is set, determining whether a higher level cache hit counter of the first cache line exceeds a higher level cache locality threshold in response to determining that the high locality indicator of the first cache line is set, and updating the higher level cache hit counter of the first cache line in response to determining that the higher level cache hit counter of the first cache line exceeds the higher level cache locality threshold.

Various aspects include computing devices having a processor, a higher level cache memory, a lower level cache memory, and a cache memory manager configured to perform operations of any of the methods summarized above.

BRIEF DESCRIPTION OF THE DRAWINGS

The accompanying drawings, which are incorporated herein and constitute part of this specification, illustrate example aspects of various aspects, and together with the general description given above and the detailed description given below, serve to explain the features of the claims.

FIGS. 8A-8K are block diagrams illustrating examples of a cache memory hierarchy system configured to retain high locality data in a higher level cache memory suitable for implementing various aspects.

DETAILED DESCRIPTION

Figure 1:
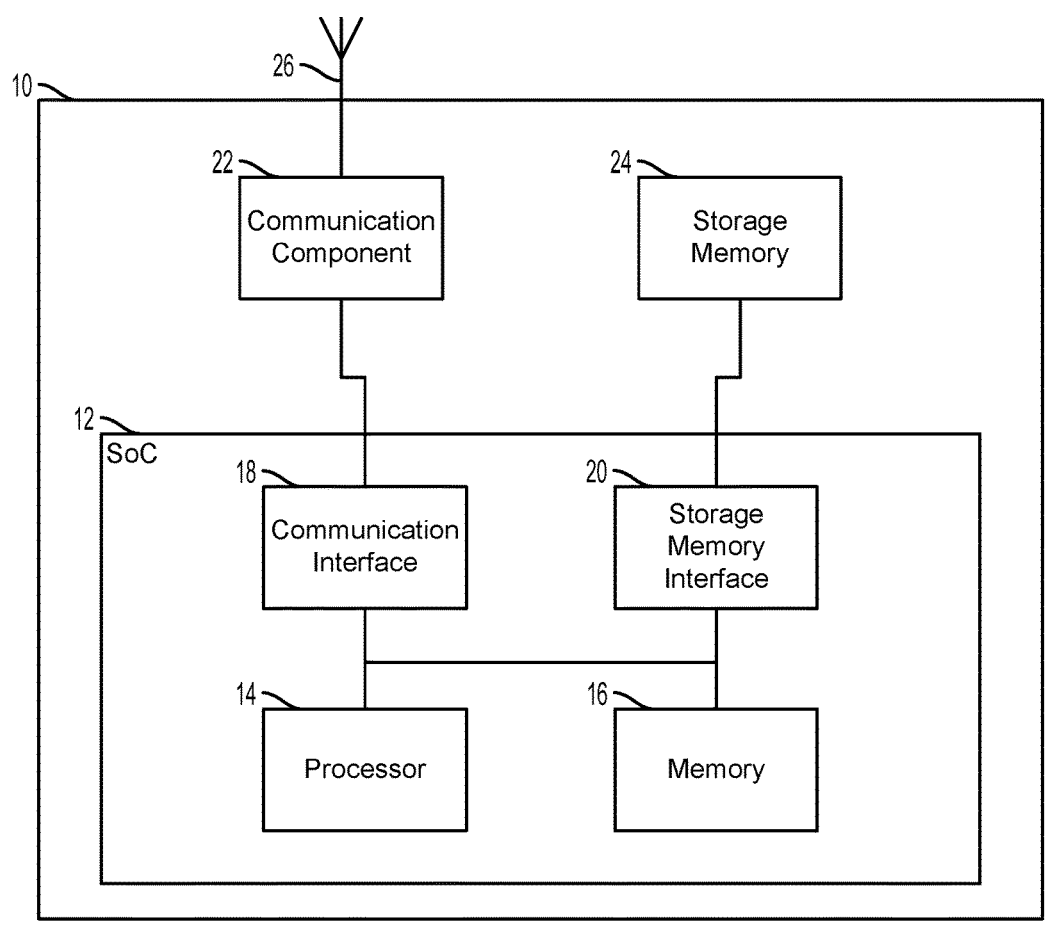
FIG. 1 is a component block diagram illustrating a computing device suitable for implementing various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various aspects may include methods, and computing devices executing such methods for improving performance by retaining high locality data in higher level cache memory. The apparatus and methods of various aspects may include indicators of a cache line in higher level cache memory (e.g., level 1 (L1) cache memory) and/or lower level cache memory (e.g., level 2 (L2) cache memory) configured for tracking locality of the cache line in the higher level cache memory. The apparatus and methods of various aspects may include new cache access requests configured to provide an indication of the locality of a target cache line of the cache access request. The apparatus and methods of various aspects may include tracking locality of the cache line based on hits of the cache line in the higher level cache memory. The apparatus and methods of various aspects may include pinning a cache line demonstrating high locality to a higher level cache memory so that the cache line may not be evicted from the higher level cache memory in opposition to an eviction policy, thereby reducing cycling of the cache lines between the higher level cache memory and a lower level cache memory and consuming unnecessary bandwidth and power. The apparatus and methods of various aspects may unpin the cache line from the higher level cache memory in response to the cache line not demonstrating high locality. The apparatus and methods of various aspects may promote cache lines to a high locality state in the higher level cache memory, demote a promoted cache line no longer demonstrating high locality, and manage the number of promoted cache lines in a cache set.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The terms "computing device" and "mobile computing device" may further refer to Internet of Things (IoT) devices, including wired and/or wirelessly connectable appliances and peripheral devices to appliances, decor devices, security devices, environment regulator devices, physiological sensor devices, audio/visual devices, toys, hobby and/or work devices, IoT device hubs, etc. The terms "computing device" and "mobile computing device" may further refer to components of personal and mass transportation vehicles. The term "computing device" may further refer to stationary computing devices including personal computers, desktop computers, all-in-one computers, workstations, super computers, mainframe computers, embedded computers, servers, home media computers, and game consoles.

FIG. 1 illustrates a system including a computing device 10 suitable for use with the various aspects. The computing device 10 may include a system-on-chip (SoC) 12 with a processor 14, a memory 16, a communication interface 18, and a storage memory interface 20. The computing device 10 may further include a communication component 22, such as a wired or wireless modem, a storage memory 24, and an antenna 26 for establishing a wireless communication link. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), a subsystem processor of specific components of the computing device, such as an image processor for a camera subsystem or a display processor for a display, an auxiliary processor, a single-core processor, and a multicore processor. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. Individual processors 14 may be multicore processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile or non-volatile memory configured for storing data and processor-executable code for access by the processor 14. The computing device 10 and/or SoC 12 may include one or more memories 16 configured for various purposes. One or more memories 16 may include volatile memories such as random access memory (RAM) or main memory, cache memory, or flash memory. These memories 16 may be configured to temporarily hold a limited amount of data received from a data sensor or subsystem, data and/or processor-executable code instructions that are requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

The memory 16 may be configured to store data and processor-executable code, at least temporarily, that is loaded to the memory 16 from another memory device, such as another memory 16 or storage memory 24, for access by one or more of the processors 14. The data or processor-executable code loaded to the memory 16 may be loaded in response to execution of a function by the processor 14. Loading the data or processor-executable code to the memory 16 in response to execution of a function may result from a memory access request to the memory 16 that is unsuccessful, or a "miss," because the requested data or processor-executable code is not located in the memory 16. In response to a miss, a memory access request to another memory 16 or storage memory 24 may be made to load the requested data or processor-executable code from the other memory 16 or storage memory 24 to the memory device 16. Loading the data or processor-executable code to the memory 16 in response to execution of a function may result from a memory access request to another memory 16 or storage memory 24, and the data or processor-executable code may be loaded to the memory 16 for later access.

The storage memory interface 20 and the storage memory 24 may work in unison to allow the computing device 10 to store data and processor-executable code on a non-volatile storage medium. The storage memory 24 may be configured much like an aspect of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

Some or all of the components of the computing device 10 may be arranged differently and/or combined while still serving the functions of the various aspects. The computing device 10 may not be limited to one of each of the components, and multiple instances of each component may be included in various configurations of the computing device 10.

Figure 2:
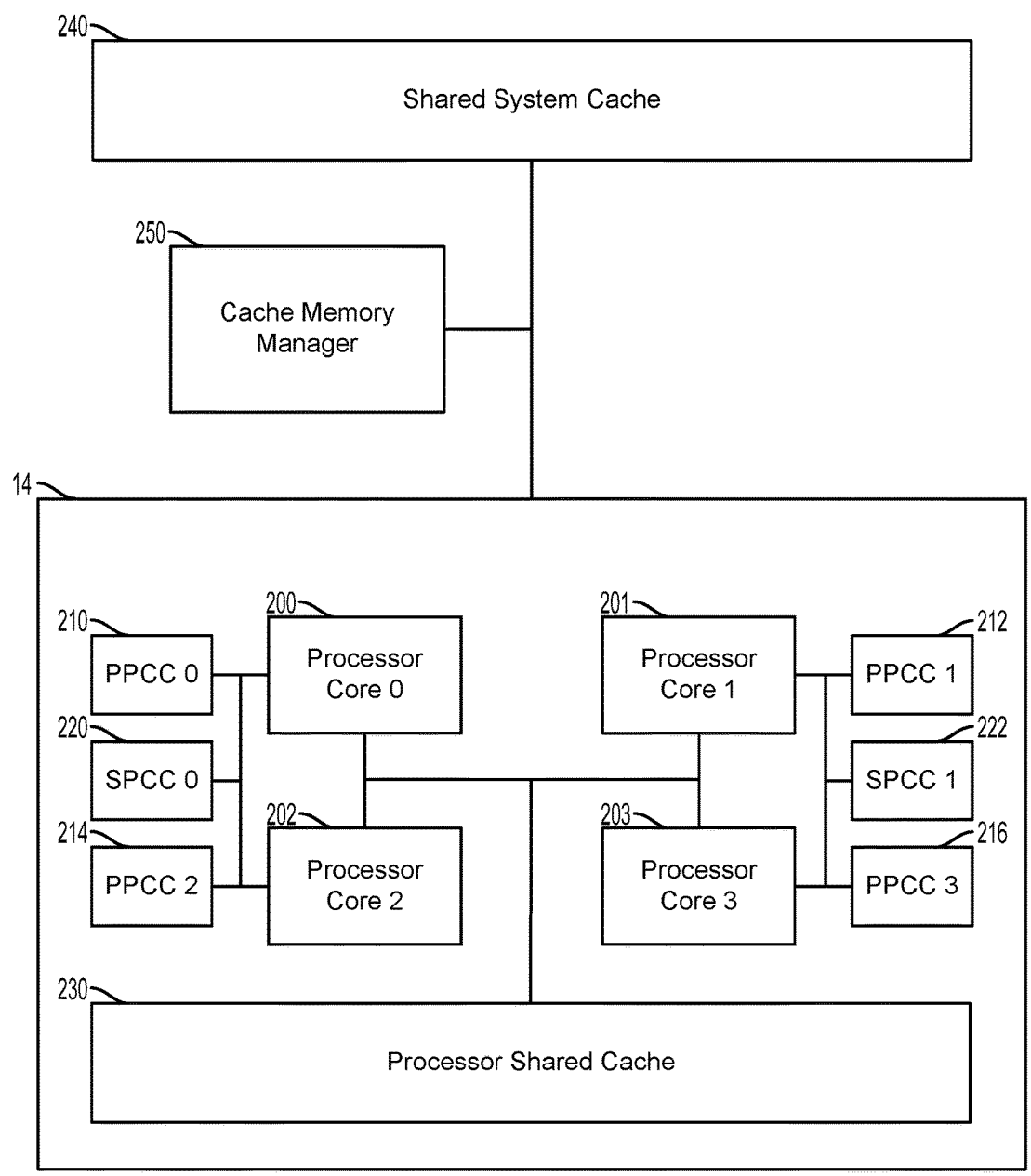
FIG. 2 is a component block diagram illustrating components of a computing device suitable for implementing various aspects.

FIG. 2 illustrates components of a computing device suitable for implementing various aspects. The processor 14 may include multiple processor types, including, for example, a CPU and various hardware accelerators, such as a GPU, a DSP, an APU, subsystem processor, etc. The processor 14 may also include a custom hardware accelerator, which may include custom processing hardware and/or general purpose hardware configured to implement a specialized set of functions. The processors 14 may include any number of processor cores 200, 201, 202, 203. A processor 14 having multiple processor cores 200, 201, 202, 203 may be referred to as a multicore processor.

The processor 14 may have a plurality of homogeneous or heterogeneous processor cores 200, 201, 202, 203. A homogeneous processor may include a plurality of homogeneous processor cores. The processor cores 200, 201, 202, 203 may be homogeneous in that, the processor cores 200, 201, 202, 203 of the processor 14 may be configured for the same purpose and have the same or similar performance characteristics. For example, the processor 14 may be a general purpose processor, and the processor cores 200, 201, 202, 203 may be homogeneous general purpose processor cores. The processor 14 may be a GPU or a DSP, and the processor cores 200, 201, 202, 203 may be homogeneous graphics processor cores or digital signal processor cores, respectively. The processor 14 may be a custom hardware accelerator with homogeneous processor cores 200, 201, 202, 203.

A heterogeneous processor may include a plurality of heterogeneous processor cores. The processor cores 200, 201, 202, 203 may be heterogeneous in that the processor cores 200, 201, 202, 203 of the processor 14 may be configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores. In similar aspects, an SoC (for example, SoC 12 of FIG. 1) may include any number of homogeneous or heterogeneous processors 14. In various aspects, not all off the processor cores 200, 201, 202, 203 need to be heterogeneous processor cores, as a heterogeneous processor may include any combination of processor cores 200, 201, 202, 203 including at least one heterogeneous processor core.

Each of the processor cores 200, 201, 202, 203 of a processor 14 may be designated a private processor core cache (PPCC) memory 210, 212, 214, 216 that may be dedicated for read and/or write access by a designated processor core 200, 201, 202, 203. The private processor core cache 210, 212, 214, 216 may store data and/or instructions, and make the stored data and/or instructions available to the processor cores 200, 201, 202, 203, to which the private processor core cache 210, 212, 214, 216 is dedicated, for use in execution by the processor cores 200, 201, 202, 203. The private processor core cache 210, 212, 214, 216 may include volatile memory as described herein with reference to memory 16 of FIG. 1.

Groups of the processor cores 200, 201, 202, 203 of a processor 14 may be designated a shared processor core cache (SPCC) memory 220, 222 that may be dedicated for read and/or write access by a designated group of processor core 200, 201, 202, 203. The shared processor core cache 220, 222 may store data and/or instructions, and make the stored data and/or instructions available to the group processor cores 200, 201, 202, 203 to which the shared processor core cache 220, 222 is dedicated for use in execution by the processor cores 200, 201, 202, 203 in the designated group. The shared processor core cache 220, 222 may include volatile memory as described herein with reference to memory 16 of FIG. 1.

The processor 14 may be designated a shared processor cache memory 230 that may be dedicated for read and/or write access by the processor cores 200, 201, 202, 203 of the processor 14. The shared processor cache 230 may store data and/or instructions, and make the stored data and/or instructions available to the processor cores 200, 201, 202, 203, for use in execution by the processor cores 200, 201, 202, 203. The shared processor cache 230 may also function as a buffer for data and/or instructions input to and/or output from the processor 14. The shared cache 230 may include volatile memory as described herein with reference to memory 16 of FIG. 1.

Multiple processors 14 may be designated a shared system cache memory 240 that may be dedicated for read and/or write access by the processor cores 200, 201, 202, 203 of the multiple processors 14. The shared system cache 240 may store data and/or instructions, and make the stored data and/or instructions available to the processor cores 200, 201, 202, 203, for use in execution by the processor cores 200, 201, 202, 203. The shared system cache 240 may also function as a buffer for data and/or instructions input to and/or output from the multiple processors 14. The shared system cache 240 may include volatile memory as described herein with reference to memory 16 of FIG. 1.

A cache memory manager 250 may be communicatively connected to a processor 14 and a cache memory 210, 212, 214, 216, 220, 222, 230, 240, and configured to control access to the cache memory 210, 212, 214, 216, 220, 222, 230, 240, and to manage and maintain the cache memory 210, 212, 214, 216, 220, 222, 230, 240. The cache memory manager 250 may be configured to pass and/or deny memory access requests to the cache memory 210, 212, 214, 216, 220, 222, 230, 240 from the processor, pass data and/or instructions to and from the cache memory 210, 212, 214, 216, 220, 222, 230, 240, and/or trigger maintenance and/or coherency operations for the cache memory 210, 212, 214, 216, 220, 222, 230, 240, including an eviction policy. In various aspects, the cache memory manager 250 may be a hardware component standalone from and/or integral to the processor 14. In various aspects, the cache memory manager 250 may be a software component configured to cause a dedicated hardware component and/or the processor 14 to execute operations for managing the cache memory 210, 212, 214, 216, 220, 222, 230, 240. In various aspects, any number of cache memory managers 250 may be associated with any number of cache memories 210, 212, 214, 216, 220, 222, 230, 240, including one-to-many, many-to-one, and one-to-one configurations. The terms "cache memory manager" and "cache memory controller" are used interchangeably throughout the descriptions.

In the example illustrated in FIG. 2, the processor 14 includes four processor cores 200, 201, 202, 203 (i.e., processor core 0, processor core 1, processor core 2, and processor core 3). In the illustrated example, each processor core 200, 201, 202, 203 is designated a respective private processor core cache 210, 212, 214, 216 (i.e., processor core 0 and private processor core cache 0, processor core 1 and private processor core cache 1, processor core 2 and private processor core cache 2, and processor core 3 and private processor core cache 3). The processor cores 200, 201, 202, 203 may be grouped, and each group may be designated a shared processor core cache 220, 222 (i.e., a group of processor core 0 and processor core 2 and shared processor core cache 0, and a group of processor core 1 and processor core 3 and shared processor core cache 1).

For ease of explanation, descriptions of various aspects may refer to the four processor cores 200, 201, 202, 203, the four private processor core caches 210, 212, 214, 216, two groups of processor cores 200, 201, 202, 203, and the shared processor core cache 220, 222 illustrated in FIG. 2. However, the four processor cores 200, 201, 202, 203, the four private processor core caches 210, 212, 214, 216, two groups of processor cores 200, 201, 202, 203, and the shared processor core cache 220, 222 illustrated in FIG. 2 and described herein are merely provided as an example and in no way are meant to limit the various aspects to a four-core processor system with four designated private processor core caches and two designated shared processor core caches 220, 222. The computing device 10, the SoC 12, or the processor 14 may individually or in combination include fewer or more than the four processor cores 200, 201, 202, 203 and private processor core caches 210, 212, 214, 216, and two shared processor core caches 220, 222 illustrated and described herein.

In various aspects, a processor core 200, 201, 202, 203 may access data and/or instructions stored in the shared processor core cache 220, 222, the shared processor cache 230, and/or the shared system cache 240 indirectly through access to data and/or instructions loaded to a higher level cache memory from a lower level cache memory. For example, levels of the various cache memories 210, 212, 214, 216, 220, 222, 230, 240 in descending order from highest level cache memory to lowest level cache memory may be the private processor core cache 210, 212, 214, 216, the shared processor core cache 220, 222, the shared processor cache 230, and the shared system cache 240. A higher level cache memory 210, 212, 214, 216, 220, 222, 230 may be any cache memory of a higher level than a lower level cache memory 220, 222, 230, 240. In various aspects, data and/or instructions may be loaded to a cache memory 210, 212, 214, 216, 220, 222, 230, 240 from a lower level cache memory 220, 222, 230, 240 and/or other memory (e.g., memory 16, 24 in FIG. 1) as a response to a miss the cache memory 210, 212, 214, 216, 220, 222, 230, 240 for a memory access request, and/or as a response to a prefetch operation speculatively retrieving data and/or instructions for future use by the processor core 200, 201, 202, 203. In various aspects, the cache memory 210, 212, 214, 216, 220, 222, 230, 240 may be managed using an eviction policy to replace data and/or instructions stored in the cache memory 210, 212, 214, 216, 220, 222, 230, 240 to allow for storing other data and/or instructions. Evicting data and/or instructions may include writing the evicted data and/or instructions evicted from a higher level cache memory 210, 212, 214, 216, 220, 222, 230 to a lower level cache memory 220, 222, 230, 240 and/or other memory.

For ease of reference, the terms "hardware accelerator," "custom hardware accelerator," "multicore processor," "processor," and "processor core" may be used interchangeably herein. The descriptions of the illustrated computing device and its various components are only meant to be examples and in no way limiting on the scope of the claims. Several of the components of the illustrated example computing device may be variably configured, combined, and separated. Several of the components may be included in greater or fewer numbers, and may be located and connected differently within the SoC or separate from the SoC.

Figure 3:
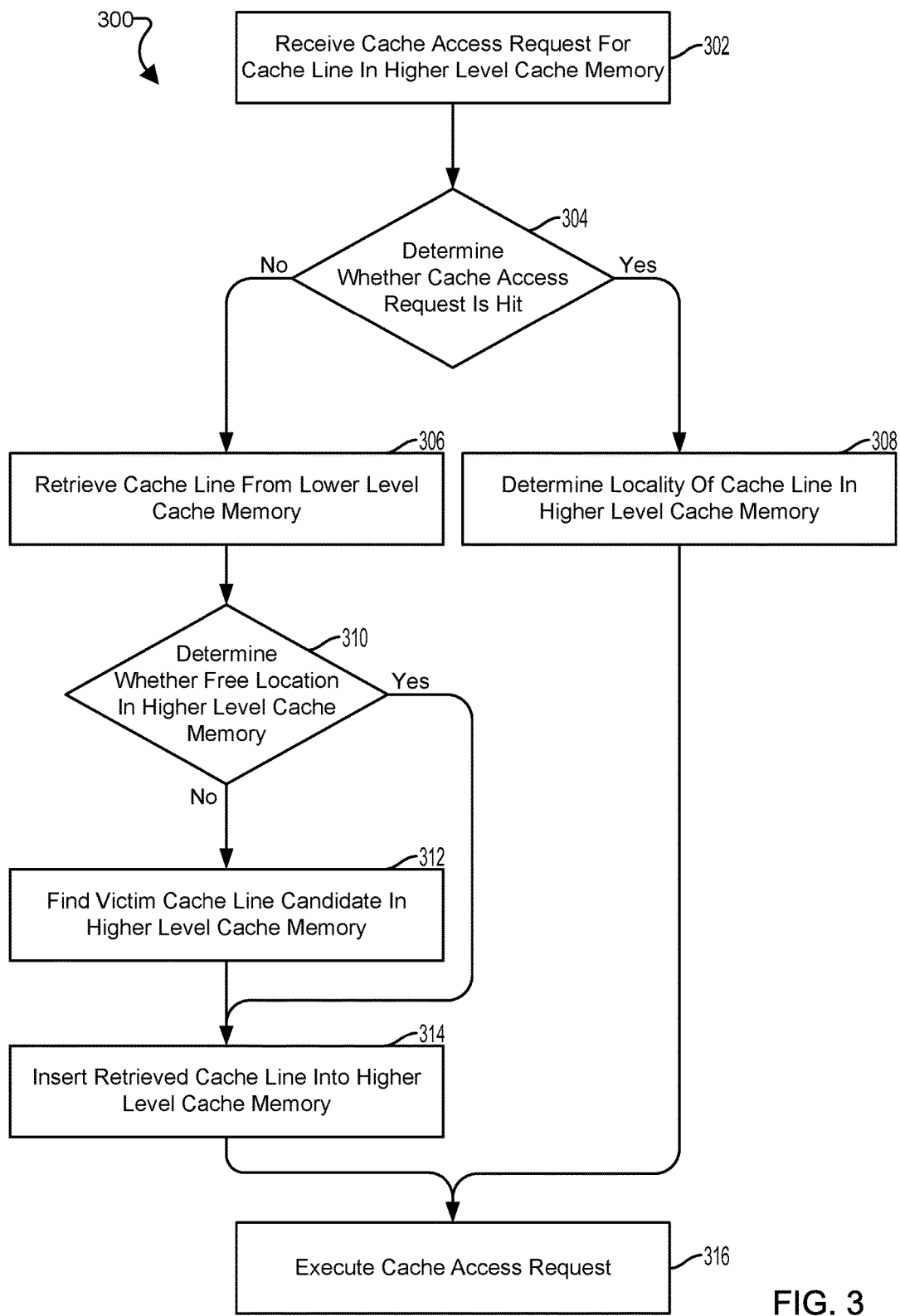
FIG. 3 is a process flow diagram illustrating a method for retaining high locality data in a higher level cache memory according to an aspect.

FIG. 3 illustrates a method 300 for retaining high locality data in a higher level cache memory according to an aspect. The method 300 may be implemented in a computing device in software executing in a processor (e.g., processor 14 in FIGS. 1 and 2), in general purpose hardware, in dedicated hardware (e.g., cache memory manager 250 in FIG. 2), or in a combination of a software-configured processor and dedicated hardware (e.g., processor 14 in FIGS. 1 and 2 and cache memory manager 250 in FIG. 2), such as a processor executing software within a cache memory hierarchy management system (e.g., cache memory hierarchy system in FIGS. 8A-8K) that includes other individual components (e.g., memory 16, 24 in FIG. 1, higher level cache memory 800, lower level cache memory 820 in FIGS. 8A-8K), and various memory/cache controllers. In order to encompass the alternative configurations enabled in various aspects, the hardware implementing the method 300 is referred to herein as a "processing device."

In block 302, the processing device may receive a cache access request for a cache line in a higher level cache memory. The cache access request may be issued for an application executing on a computing device (e.g., computing device 10 in FIG. 1). The cache access request may include a read, write, load, and/or store cache access request. In various aspects, the cache access request may be configured to indicate a locality of a target cache line of the cache access request, as described further herein with reference to the method 500 illustrated in FIG. 5.

In determination block 304, the processing device may determine whether cache access request results in a hit for the targeted cache line in the higher level cache memory. In various aspects, the processing device may check directly in the higher level cache memory and/or check a snoop directory of the higher level cache memory to determine whether the targeted cache line is stored in the higher level cache memory. Determining from the check that the targeted cache line is stored in the higher level cache memory may indicate that the cache access request results in a "hit" for the targeted cache line in the higher level cache memory. Determining from the check that the targeted cache line is not stored in the higher level cache memory may indicate that the cache access request results in a "miss" for the targeted cache line in the higher level cache memory.

In response to determining that the cache access request does not result in a hit for the targeted cache line in the higher level cache memory (i.e., determination block 304="No"), the processing device may retrieve the cache line from a lower level cache memory in block 306. The processing device may make a cache access request to the lower level cache memory for the cache line and determine whether cache access request to the lower level cache memory results in a hit in the lower level cache memory. In response to determining that cache access request to the lower level cache memory for the cache line results in a hit, the processing device may retrieve the cache line from the lower level cache and store the cache line in the higher level cache. In response to determining that cache access request to the lower level cache memory for the cache line does not result in a hit, the processing device may retrieve the cache line from another memory (e.g., memory 16, 24 in FIG. 1) and store the cache line in the higher level cache.

In determination block 310, the processing device may determine whether a free location is available in the higher level cache memory. The processing device may check directly in the higher level cache memory, may check a snoop directory, and/or check a cache memory usage and/or availability table for a free location in the higher level cache memory.

In response to determining that a free location is not available in the higher level cache memory (i.e., determination block 310="No"), the processing device may find a victim cache line candidate in the higher level cache memory in block 312. A victim cache line candidate may be a cache line in the higher level cache memory that may be evicted from the higher level cache memory, thereby freeing a location in the higher level cache memory into which may be inserted the cache line retrieved from the lower level cache memory in block 306. In various aspects, the processing device may use any eviction criteria, such as least recently used, not most recently used, first in first out, etc. to find the victim cache line candidate. Examples of operations that may be involved in finding a victim cache line candidate in the higher level cache memory in block 312 are described with reference to the method 400 illustrated in FIG. 4 and the method 900 illustrated in FIG. 9.

After finding a victim cache line candidate in the higher level cache memory in block 312 or in response to determining that a free location is available in the higher level cache memory (i.e., determination block 310="Yes"), the processing device may insert retrieved cache line into higher level cache memory in block 314. The processing device may write the contents of the cache line retrieved from the lower level cache memory to the free location in the higher level cache memory. Examples of operations that may be involved in inserting retrieved cache line into higher level cache memory in block 314 may are described with reference to the method 1100 illustrated in FIG. 11.

In response to determining that the cache access request results in a hit for the targeted cache line in the higher level cache memory (i.e., determination block 304="Yes"), the processing device may determine a locality of the cache line in the higher level cache memory in block 308. In various aspects, the processing device may interpret an indication of the locality of the targeted cache line from cache access request. The indication of the locality of the targeted cache line may include a signal accompanying the cache access request and/or a flag set in a portion of the cache access request, such as a designated bit set in a metadata of the cache access request, indicating high locality and/or not high locality for the targeted cache line. In various aspects, the processing device may access the cache line in the higher level cache memory and check a high locality indicator field of the cache line for a high locality indicator (e.g., high locality indicator 808 in FIGS. 8A-8K). The processing device may determine from the high locality indicator whether the high locality indicator is set or not set, or reset. For example, as discussed herein, a value of a binary format high locality indicator="1" may indicate that the high locality indicator is set indicating that the cache line has high locality, and a value of the binary format high locality indicator="0" may indicate that the accessed indicator is not set, or reset, indicating that the cache line does not have high locality. Examples of operations that may be involved in determining a locality of the cache line in the higher level cache memory in block 308 may are described with reference to the method 500 illustrated in FIG. 5 and the method 1400 illustrated in FIG. 14.

After inserting retrieved cache line into higher level cache memory in block 314 or determining a locality of the cache line in the higher level cache memory in block 308, the processing device may execute the cache access request for the cache line in the higher level cache memory in block 316. In various aspects, the processing device may access the cache line in the higher level cache memory and retrieve from and/or write to the cache line data and/or instructions.

Figure 4:
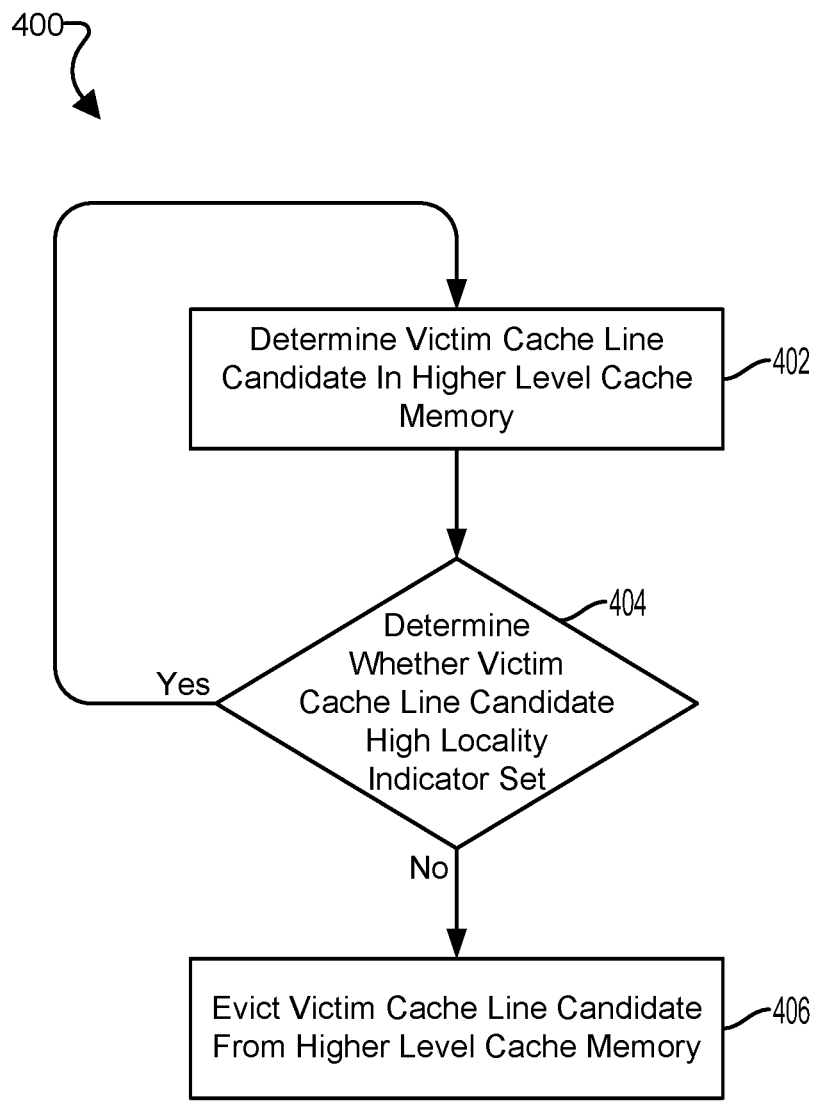
FIG. 4 is a process flow diagram illustrating a method for finding a victim cache line candidate in a higher level cache memory for retaining high locality data in the higher level cache memory according to an aspect.

FIG. 4 illustrates a method 400 for finding a victim cache line candidate in a higher level cache memory for retaining high locality data in the higher level cache memory according to an aspect. The method 400 may be implemented in a computing device in software executing in a processor (e.g., processor 14 in FIGS. 1 and 2), in general purpose hardware, in dedicated hardware (e.g., cache memory manager 250 in FIG. 2), or in a combination of a software-configured processor and dedicated hardware (e.g., processor 14 in FIGS. 1 and 2 and cache memory manager 250 in FIG. 2), such as a processor executing software within a cache memory hierarchy management system (e.g., cache memory hierarchy system in FIGS. 8A-8K) that includes other individual components (e.g., memory 16, 24 in FIG. 1, higher level cache memory 800, lower level cache memory 820 in FIGS. 8A-8K), and various memory/cache controllers. In order to encompass the alternative configurations enabled in various aspects, the hardware implementing the method 400 is referred to herein as a "processing device." The method 400 includes operations that may be involved in finding a victim cache line candidate in the higher level cache memory in block 312 of the method 300 as described with reference to FIG. 3.

In block 402, the processing device may determine the victim cache line candidate in the higher level cache memory. In various aspects, the processing device may use any eviction policy based on any eviction criteria, such as least recently used, not most recently used, first in first out, etc., to determine the victim cache line candidate.

In determination block 404, the processing device may determine whether the victim cache line candidate high locality indicator (e.g., high locality indicator 808 in FIGS. 8A-8K) is set. The processing device may access the victim cache line candidate in the higher level cache memory and check a high locality indicator field of the victim cache line candidate for the high locality indicator. The processing device may determine from the high locality indicator whether the high locality indicator is set or not set, or reset. For example, as discussed herein, a value of a binary format high locality indicator="1" may indicate that the high locality indicator is set indicating that the cache line has high locality, and a value of the binary format high locality indicator="0" may indicate that the accessed indicator is not set, or reset, indicating that the cache line does not have high locality.

In response to determining that the victim cache line candidate high locality indicator is set (i.e., determination block 404="Yes"), the processing device may determine another victim cache line candidate in the higher level cache memory in block 402. The processing device using the same eviction policy may select a next victim cache line candidate in the higher level cache memory based on the eviction criteria. For example, the processing device may execute the eviction policy using an eviction queue in which victim cache line candidates are ordered according to the eviction criteria, and a next victim cache line candidate may be a victim cache line candidate in a next position in the eviction queue. In various aspects, the eviction queue may be implemented using memory, such as a register, and/or data structure having ordered identifiers for each victim cache line candidate in the eviction queue. In various aspects, the eviction queue may be implemented by assigning each victim cache line candidate a value indicating an order for eviction.

In response to determining that the victim cache line candidate high locality indicator is not set (i.e., determination block 404="No"), the processing device may evict the victim cache line candidate from the higher level cache memory in block 406. In various aspects, the processing device may evict the victim cache line candidate by marking the victim cache line candidate invalid in the higher level cache memory, by removing the victim cache line candidate from the higher level cache memory, and/or overwriting the victim cache line candidate in the higher level cache memory.

Figure 5:
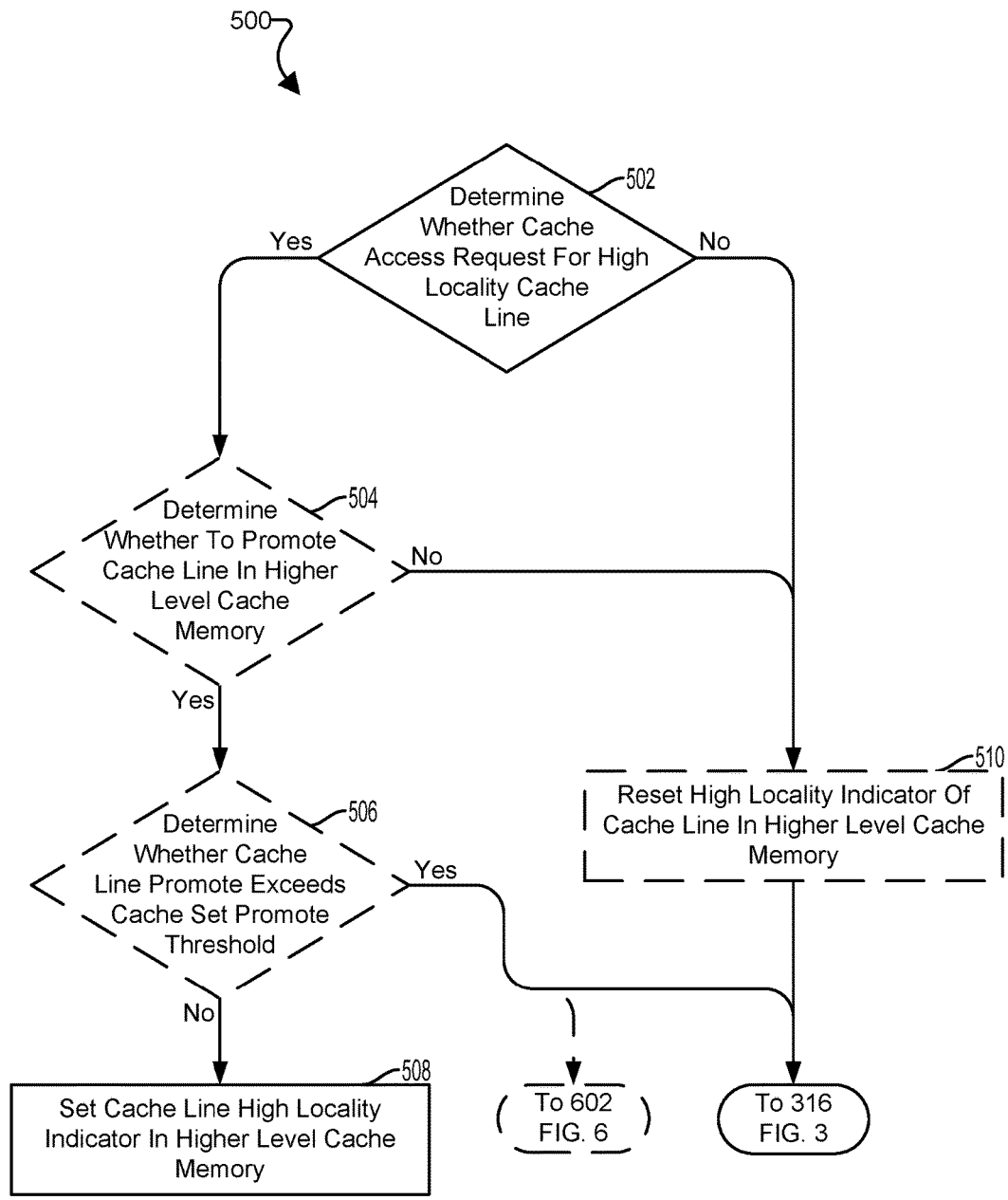
FIG. 5 is a process flow diagram illustrating a method for determining locality of a cache line in a higher level cache memory for retaining high locality data in the higher level cache memory according to an aspect.

FIG. 5 illustrates a method 500 for determining locality of a cache line in a higher level cache memory for retaining high locality data in the higher level cache memory according to an aspect. The method 500 may be implemented in a computing device in software executing in a processor (e.g., processor 14 in FIGS. 1 and 2), in general purpose hardware, in dedicated hardware (e.g., cache memory manager 250 in FIG. 2), or in a combination of a software-configured processor and dedicated hardware (e.g., processor 14 in FIGS. 1 and 2 and cache memory manager 250 in FIG. 2), such as a processor executing software within a cache memory hierarchy management system (e.g., cache memory hierarchy system in FIGS. 8A-8K) that includes other individual components (e.g., memory 16, 24 in FIG. 1, higher level cache memory 800, lower level cache memory 820 in FIGS. 8A-8K), and various memory/cache controllers. In order to encompass the alternative configurations enabled in various aspects, the hardware implementing the method 500 is referred to herein as a "processing device." The method 500 includes operations that may be involved in determining a locality of the cache line in the higher level cache memory in block 308 of the method 300 described with reference to FIG. 3.

In determination block 502, the processing device may determine whether the cache access request is for a high locality cache line. In various aspects, the processing device may interpret an indication of the locality of the targeted cache line from cache access request. The indication of the locality of the targeted cache line may include a signal accompanying the cache access request and/or a flag set in a portion of the cache access request, such as a designated bit set in a metadata of the cache access request, indicating high locality and/or not high locality for the targeted cache line.

Determining that the cache access request is for a high locality cache line may result in pinning the target cache line to the higher level cache memory, based on various operations that consider the locality of the cache line for execution of the various operations. As discussed further herein, a cache access request for a high locality cache line may prompt setting the cache line high locality indicator in the higher level memory in block 508. In the method 400 for finding a victim cache line candidate in the higher level cache memory for retaining high locality data in the higher level cache memory, described with reference to FIG. 4, in response to determining that the victim cache line candidate high locality indicator is set (i.e., determination block 404="Yes"), the processing device may determine another victim cache line candidate in the higher level cache memory in block 402. In other words, the setting the cache line high locality indicator may prevent eviction of the cache line when it is considered as a victim cache line candidate, thereby pinning the cache line to the higher level cache memory.

Determining that the cache access request is not for a high locality cache line may result in unpinning the target cache line from the higher level cache memory, based on various operations that consider the locality of the cache line for execution of the various operations. As discussed further herein, a cache access request for a not high locality cache line may prompt resetting the cache line high locality indicator in the higher level memory in optional block 510. In the method 400 for finding a victim cache line candidate in the higher level cache memory for retaining high locality data in the higher level cache memory, described with reference to FIG. 4, in response to determining that the victim cache line candidate high locality indicator is not set (i.e., determination block 404="No"), the processing device may evict the victim cache line candidate from the higher level cache memory in block 406. In other words, the resetting the cache line high locality indicator may allow for eviction of the cache line when it is considered as a victim cache line candidate, thereby unpinning the cache line to the higher level cache memory.

In response to determining that the cache access request is for a high locality cache line (i.e., determination block 502="Yes"), the processing device may determine whether to promote the cache line in higher level cache memory in optional determination block 504. In various aspects, a compiler, executed by the processor, may determine whether to promote the cache line to a high locality cache line by allowing the processing device to set the high locality indicator of cache line in the higher level cache memory in block 508, as discussed further herein. The compiler may enforce the use of directive pairs to enforce eventual unpinning of a pinned cache line. The compiler may be configured to avoid errors by a programmer that may leave a cache line pinned to the higher level cache memory even though it may no longer have high locality for an application executing on the computing device (e.g., computing device 10 in FIG. 1). A cache line that may not be unpinned from the higher level cache memory by the application may be denied promotion to a high locality cache line by not setting the high locality indicator for the cache line and/or resetting the high locality indicator for the cache in optional block 510, as discussed further herein. A cache line that may be unpinned from the higher level cache memory by the application may be granted promotion to a high locality cache line by setting the high locality indicator of cache line in block 508, as discussed further herein.

In response to determining that the cache access request is for a high locality cache line (i.e., determination block 502="Yes") or in response to determining to promote the cache line in higher level cache memory (i.e., optional determination block 504="Yes"), the processing device may determine whether the cache line promotion exceeds a cache set promote threshold in optional determination block 506. The processing device may limit a number of high locality cache lines in a cache set of the higher level cache memory. The cache lines of a cache set may be promoted to high locality cache lines, and the processing device may track the number of high locality cache lines in the cache set and determine whether promoting a cache line to high locality in the cache set may exceed a cache set promote threshold. The cache set promote threshold may be configured as a limit of the number of high locality cache lines in the cache set. The cache set promote threshold may be configured as a predesignated value and/or a calculated value, such as a percentage of a number of cache lines in the cache set in the higher level cache memory. For example, the cache set promote threshold may be 25% of the cache lines in the cache set. A comparison of a number of cache lines including the high locality cache lines in the cache set plus an additional high locality cache line to the cache set promote threshold resulting in the number of high locality cache lines exceeding the cache set promote threshold may prompt the processing device to determine to not promote the cache line in the higher level cache memory. A comparison of the number of cache lines including the high locality cache lines in the cache set plus an additional high locality cache line to the cache set promote threshold resulting in the number of high locality cache lines not exceeding the cache set promote threshold may prompt the processing device to determine to promote the cache line in the higher level cache memory.

In response to determining that the cache line promotion exceeds a cache set promote threshold (i.e., optional determination block 506="Yes"), the processing device may execute the cache access request for the cache line in the higher level cache memory in block 316 of the method 300 as described with reference to FIG. 3. In various aspects, in response to determining that the cache line promotion exceeds a cache set promote threshold (i.e., optional determination block 506="Yes"), the processing device may also determine whether a high locality counter exceeds a demote threshold in optional determination block 602 of the method 600 as described with reference to FIG. 6.

In response to determining that the cache access request is for a high locality cache line (i.e., determination block 502="Yes"), in response to determining to promote the cache line in higher level cache memory (i.e., optional determination block 504="Yes"), or in response to determining that the cache line promotion does not exceed a cache set promote threshold (i.e., optional determination block 506="No"), the processing device may set the cache line high locality indicator in the higher level cache memory in block 508. The processing device may access the cache line in the higher level cache memory and check the high locality indicator field of the cache line for the high locality indicator. The processing device may determine from the high locality indicator whether to set or maintain the high locality indicator for the cache line. For example, as discussed herein, a value of a binary format high locality indicator="1" may indicate that the high locality indicator is set indicating that the cache line has high locality, and a value of the binary format high locality indicator="0" may indicate that the accessed indicator is not set, or reset, indicating that the cache line does not have high locality. In various aspects, regardless of the value of the high locality indicator and/or in response to determining that the high locality indicator is not set, or reset, the processing device may write a value of "1" to the high locality indicator field to set the high locality indicator. In various aspects the processing device may maintain a set high locality indicator by writing a value of "1" to the high locality indicator field and/or by not writing any value to the high locality indicator field.

In response to determining that the cache access request is not for a high locality cache line (i.e., determination block 502="No") or in response to determining to not promote the cache line in higher level cache memory (i.e., optional determination block 504="No"), the processing device may reset the high locality indicator of the cache line in the higher level cache memory in optional block 510. The processing device may access the cache line in the higher level cache memory and check the high locality indicator field of the cache line for the high locality indicator. The processing device may determine from the high locality indicator whether to reset or maintain the high locality indicator for the cache line. For example, as discussed herein, a value of a binary format high locality indicator="1" may indicate that the high locality indicator is set indicating that the cache line has high locality, and a value of the binary format high locality indicator="0" may indicate that the accessed indicator is not set, or reset, indicating that the cache line does not have high locality. In various aspects, regardless of the value of the high locality indicator and/or in response to determining that the high locality indicator is set, the processing device may write a value of "0" to the high locality indicator field to reset the high locality indicator. In various aspects the processing device may maintain a not set, or reset, high locality indicator by writing a value of "0" to the high locality indicator field and/or by not writing any value to the high locality indicator field.

In response to determining that the cache access request is not for a high locality cache line (i.e., determination block 502="No"), in response to determining to not promote the cache line in higher level cache memory (i.e., optional determination block 504="No"), or after resetting the high locality indicator of the cache line in the higher level cache memory in optional block 510, the processing device may execute the cache access request for the cache line in the higher level cache memory in block 316 of the method 300 as described with reference to FIG. 3.

Figure 6:
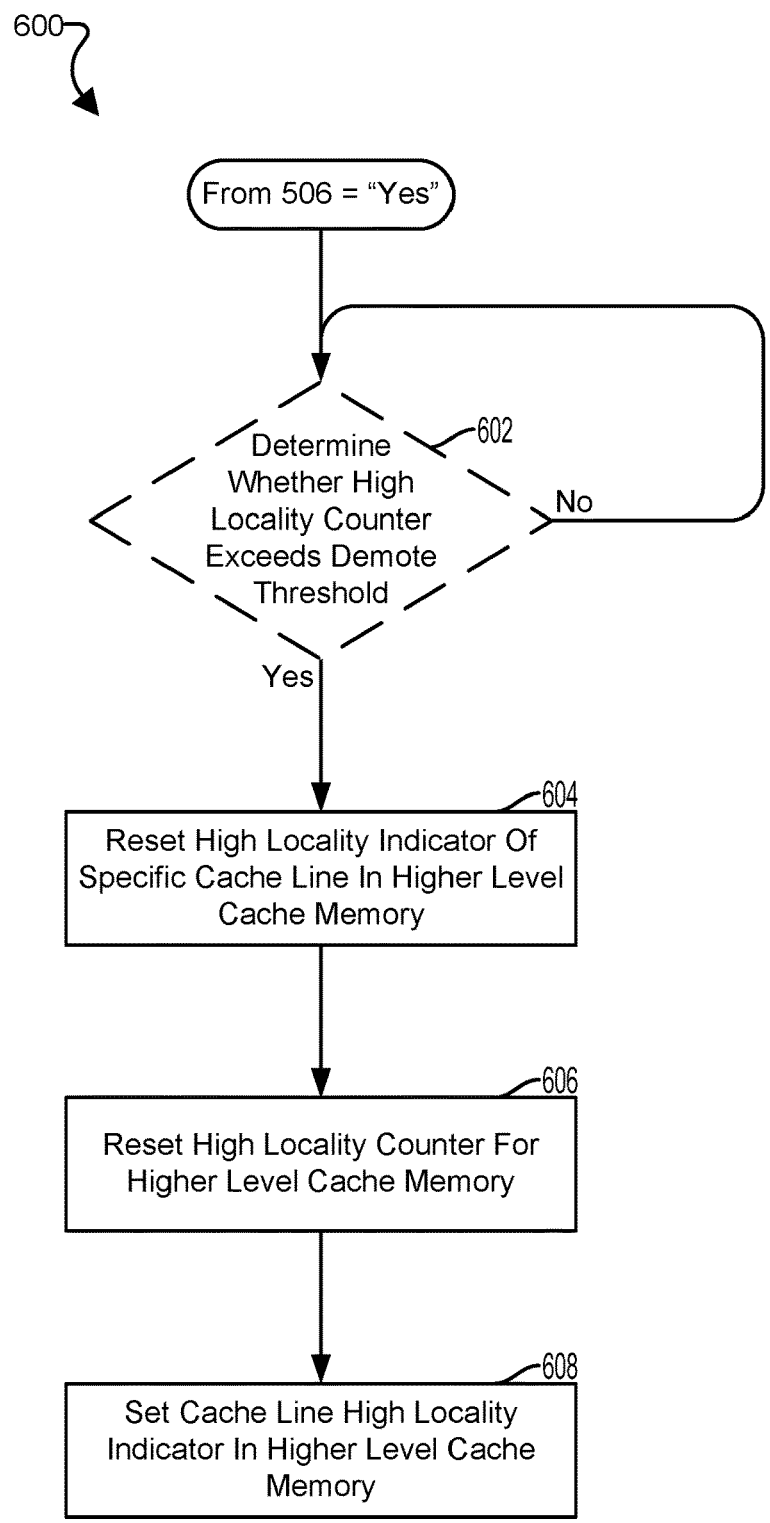
FIG. 6 is a process flow diagram illustrating a method for determining locality of a cache line in a higher level cache memory for retaining high locality data in the higher level cache memory according to an aspect.

FIG. 6 illustrates a method 600 for determining locality of a cache line in a higher level cache memory for retaining high locality data in the higher level cache memory according to an aspect. The method 600 may be implemented in a computing device in software executing in a processor (e.g., processor 14 in FIGS. 1 and 2), in general purpose hardware, in dedicated hardware (e.g., cache memory manager 250 in FIG. 2), or in a combination of a software-configured processor and dedicated hardware (e.g., processor 14 in FIGS. 1 and 2 and cache memory manager 250 in FIG. 2), such as a processor executing software within a cache memory hierarchy management system (e.g., cache memory hierarchy system in FIGS. 8A-8K) that includes other individual components (e.g., memory 16, 24 in FIG. 1, higher level cache memory 800, lower level cache memory 820 in FIGS. 8A-8K), and various memory/cache controllers. In order to encompass the alternative configurations enabled in various aspects, the hardware implementing the method 600 is referred to herein as a "processing device."

In optional determination block 602, the processing device may determine whether a high locality counter exceeds a demote threshold. In various aspect the processing device may track a duration from demotion and/or promotion of cache lines from the cache set and/or a duration a specific cache line is set to high locality in the cache set, referred to herein as a high locality duration. The processing device may update a high locality counter to track the high locality duration for the cache set and/or the specific cache line in the cache set. The processing device may compare the high locality counter to a demote threshold configured as a limit of a number of units for the high locality duration. The units may be any units such as units of time, number of executed operations, number of transistor flops, etc. A comparison of the high locality counter to the demote threshold resulting in the high locality counter exceeding the demote threshold may prompt the processing device to determine to demote a cache line from the cache set and/or the specific cache line in the cache set from high locality to not high locality. A comparison of the high locality counter to the demote threshold resulting in the high locality counter not exceeding the demote threshold may prompt the processing device to determine to maintain the cache lines in the cache set and maintain the high locality of the cache lines in the cache set and/or of the specific cache line in the cache set.

In response to determining the high locality counter does not exceed the demote threshold (i.e., optional determination block 602="No"), the processing device may repeatedly determine whether the high locality counter exceeds the demote threshold in optional determination block 602.

In response to determining the high locality counter exceeds the demote threshold (i.e., optional determination block 602="Yes"), the processing device may reset the high locality indicator of a cache line in the cache set in higher level cache memory in block 604. In various aspects, the processing device may select any of the cache lines in the cache set to reset the cache line's high locality indicator using any criteria, such as least recently promoted, not most recently promoted, first promoted first demoted, etc. In various aspects, the processing device may reset the high locality indicator of the specific cache line in the cache set. The processing device may access the cache line in the higher level cache memory to reset the high locality indicator. The processing device may write a value to the high locality indicator field to reset the high locality indicator. For example, as discussed herein, a value of the binary format high locality indicator="0" may indicate that the accessed indicator is not set, or reset, indicating that the cache line in the cache set does not have high locality.

In block 606, the processing device may reset the high locality counter. In various aspects, resetting the high locality counter may include setting a starting value from which the high locality duration may be calculated. In various aspects, resetting the high locality counter may include resetting a value of the high locality counter.

In block 608, the processing device may set the cache line high locality indicator in higher level cache memory for the cache line targeted by the cache access request. The processing device may access the cache line targeted by the cache access request in the higher level cache memory. The processing device may write a value to the high locality indicator field to set the high locality indicator. For example, as discussed herein, a value of the binary format high locality indicator="1" may indicate that the accessed indicator is set, indicating that the cache line targeted by the cache access request has high locality.

Figure 7:
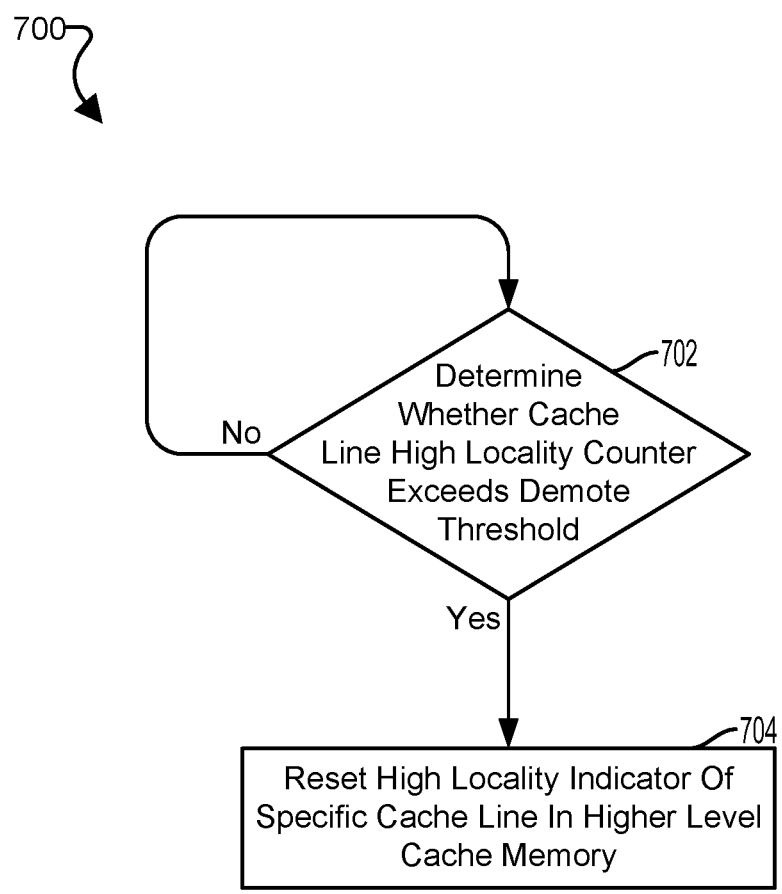
FIG. 7 is a process flow diagram illustrating a method for determining locality of a cache line in a higher level cache memory for retaining high locality data in the higher level cache memory according to an aspect.

FIG. 7 illustrates a method 700 for determining locality of a cache line in a higher level cache memory for retaining high locality data in the higher level cache memory according to an aspect. The method 700 may be implemented in a computing device in software executing in a processor (e.g., processor 14 in FIGS. 1 and 2), in general purpose hardware, in dedicated hardware (e.g., cache memory manager 250 in FIG. 2), or in a combination of a software-configured processor and dedicated hardware (e.g., processor 14 in FIGS. 1 and 2 and cache memory manager 250 in FIG. 2), such as a processor executing software within a cache memory hierarchy management system (e.g., cache memory hierarchy system in FIGS. 8A-8K) that includes other individual components (e.g., memory 16, 24 in FIG. 1, higher level cache memory 800, lower level cache memory 820 in FIGS. 8A-8K), and various memory/cache controllers. In order to encompass the alternative configurations enabled in various aspects, the hardware implementing the method 700 is referred to herein as a "processing device."

In determination block 702, the processing device may determine whether a cache line high locality counter exceeds a cache line demote threshold. In various aspects, the processing device may track a duration a specific cache line is set to high locality, referred to herein as a cache line high locality duration. The processing device may update a cache line high locality counter to track the cache line high locality duration for the specific cache line. The processing device may compare the cache line high locality counter to a cache line demote threshold configured as a limit of a number of units for the cache line high locality duration. The units may be any units such as units of time, number of executed operations, number of transistor flops, etc. A comparison of the cache line high locality counter to the cache line demote threshold resulting in the cache line high locality counter exceeding the cache line demote threshold may prompt the processing device to determine to demote the specific cache from high locality to not high locality. A comparison of the cache line high locality counter to the cache line demote threshold resulting in the cache line high locality counter not exceeding the cache line demote threshold may prompt the processing device to determine to maintain the high locality of the specific cache line.

In response to determining the cache line high locality counter does not exceed the cache line demote threshold (i.e., determination block 702="No"), the processing device may repeatedly determine whether the cache line high locality counter exceeds the cache line demote threshold in determination block 702.

In response to determining the cache line high locality counter exceeds the cache line demote threshold (i.e., determination block 702="Yes"), the processing device may reset high the locality indicator of the specific cache line in higher level cache memory in block 704. The processing device may access the specific cache line in the higher level cache memory to reset the locality indicator. The processing device may write a value to the high locality indicator field to reset the high locality indicator. For example, as discussed herein, a value of the binary format high locality indicator="0" may indicate that the accessed indicator is not set, or reset, indicating that the specific cache line does not have high locality.

FIGS. 8A-8K illustrate examples of a cache memory hierarchy system configured to retain high locality data in a higher level cache memory suitable for implementing various aspects. FIGS. 8A-8K illustrate various aspects of a cache memory hierarchy system configured to retain high locality data in a higher level cache memory. The illustrated aspects may include a higher level cache memory 800 (e.g., higher level cache memory 210, 212, 214, 216, 220, 222, 230 in FIG. 2; e.g., level 1 (L1) cache memory and/or level 2 (L2) cache memory), a lower level cache memory 820 (e.g., lower level cache memory 220, 222, 230, 240 in FIG. 2; e.g., L2 cache memory and/or level 3 (L3) cache memory), and any number of cache memory managers (not shown; e.g., cache memory manager 250 in FIG. 2). The higher level cache memory 800 may be any cache memory of a higher level than the lower level cache memory 820, including at least a last level cache memory, which may be a lowest level cache memory of the cache memory hierarchy.

Figure 8A:
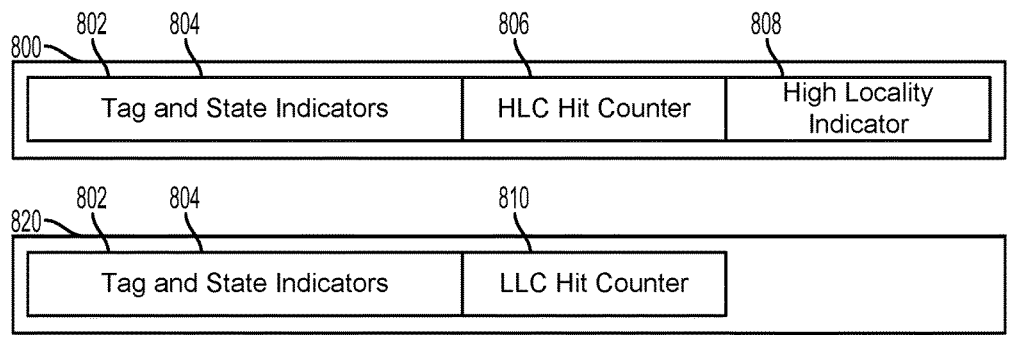

FIG. 8A illustrates an example cache memory hierarchy system configured to retain high locality data in a higher level cache memory having a higher level cache memory 800 and a lower level cache memory 820. The higher level cache memory 800 and the lower level cache memory 820 may divided into any number of segments configured to store data and/or instructions of any size, such as a cache line 802, which may also be known as a cache block.

A cache line 802 may include data and/or instructions for use by an application executed by a processor and data configured to identify and configure the cache line 802. In various aspects, the cache line 802 may include a field for tag and state indicators 804, a field for a higher level cache (HLC) hit counter 806, a field for a high locality indicator 808, and/or a field for a lower level cache (LLC) hit counter 810. The tag and state indicators 804 may be configured to identify the cache line 802 for access to the cache line 802. The higher level cache hit counter 806 may be configured to indicate a number of times the cache line 802 is accessed in the higher level cache memory 800, for example, while the cache line 802 is in the higher level cache memory 800 between an insertion into the higher level cache memory 800 and an eviction from the higher level cache memory 800, referred to herein as a tracking period. The higher level cache hit counter 806 may also be configured to indicate a number of times the cache line 802 is selected as a victim cache line candidate in the higher level cache memory 800, for example, while the cache line 802 is in the higher level cache memory 800 during a tracking period. The lower level cache hit counter 810 may be configured to indicate a number of times the cache line 802 achieves a designated number of hits in the higher level cache memory 800 across any number of tracking periods. The higher level cache hit counter 806 and the lower level cache hit counter 810 may correlate to and indicate a locality of the cache line 802. The high locality indicator 808 may be configured to indicate a locality state of the cache line 802, such as having high locality and not having high locality.

In various aspects, the higher level cache memory 800 and/or the lower level cache memory 820 may be configured as an inclusive cache memory, for which the cache line 802 in maintained in the higher level cache memory 800 and the lower level cache memory 820 in response to accesses of the cache line 802 that store the cache line 802 in the other of the higher level cache memory 800 and the lower level cache memory 820. The examples illustrated in FIGS. 8A-8K show the higher level cache memory 800 and the lower level cache memory 820 configured as inclusive cache memories, for which the higher level cache hit counter 806 and the high locality indicator 808 for the cache line 802 may be stored in the higher level cache memory 800, and the lower level cache hit counter 810 for the cache line 802 may be stored in the lower level cache memory 820.

In various aspects, the higher level cache memory 800 and/or the lower level cache memory 820 may be configured as an exclusive cache memory, for which the cache line 802 in removed and/or invalidated in the higher level cache memory 800 and/or the lower level cache memory 820 in response to accesses of the cache line 802 that store the cache line 802 in the other of the higher level cache memory 800 and the lower level cache memory 820. For exclusive cache memories, the higher level cache hit counter 806, the high locality indicator 808, and the lower level cache hit counter 810 for the cache line 802 may be stored in the same of the higher level cache memory 800 or the lower level cache memory 820 as the cache line 820 is stored in at any time. In other words, storing the higher level cache hit counter 806, the high locality indicator 808, and the lower level cache hit counter 810 for the cache line 802 may switch between the higher level cache memory 800 and the lower level cache memory 820 the cache line 820 in correspondence with storage of the cache line 802 switching between the higher level cache memory 800 and the lower level cache memory 820.

A cache memory manager (e.g., cache memory manager 250 in FIG. 2) may be configured to update and analyze the cache line 802 in the higher level cache memory 800 and/or the lower level cache memory 820. In response to an access of the cache line 802 in the higher level cache memory 800, the cache memory manager may be configured to update the higher level cache hit counter 806 of the cache line 802 in the higher level cache memory 800. In response to an selection of the cache line 802 in the higher level cache memory 800 as a victim cache line candidate, the cache memory manager may be configured to update the higher level cache hit counter 806 of the cache line 802 in the higher level cache memory 800. The cache memory manager may also be configured to update the high locality indicator 808 of the cache line 802 in response to the access of the cache line 802 in the higher level cache memory 800. In response to an eviction of the cache line 802 from the higher level cache memory 800, the cache memory manager may be configured to update the lower level cache hit counter 810 of the cache line 802 in the lower level cache memory 820. In various aspects, such as for exclusive cache memories, storing the lower level cache hit counter 810 for the cache line 802 in the higher level cache memory 800 may prompt the cache memory manager to reset the lower level cache hit counter 810.

In various aspects, the higher level cache hit counter 806, the lower level cache hit counter 810, and the high locality indicator 808 may be configured using various formats, data, and/or symbols, including any number and/or size. For the sake of example and ease of explanation, not meant to limit the scope of the descriptions and claims: the higher level cache hit counter 806 may be a 2 bit binary counter for a range of values "00" to "11" which may indicate a number of times the cache line 802 is accessed in the higher level cache memory 800; the lower level cache hit counter 810 may be a 2 bit binary counter for a range of values "00" to "11" which may indicate a number of times the cache line 802 achieves a designated number of hits in the higher level cache memory 800 across multiple tracking periods; and the high locality indicator 808 may be a 1 bit binary indicator for which a "0" value may indicate a locality state of not having high locality and a "1" value may indicate a locality state of having high locality for the cache line 802.

In response to an access of the cache line 802 in the higher level cache memory 800, the cache memory manager may update the higher level cache hit counter 806. The cache memory manager may increase the higher level cache hit counter 806 in response to the access of the cache line 802 in the higher level cache memory 800 during a tracking period. In other words, the cache memory manager may increase the higher level cache hit counter 806 for a hit of the cache line 802 in the higher level cache memory 800. The cache memory manager may reset the higher level cache hit counter 806 in response to the access of the cache line 802 in the higher level cache memory 800 at the beginning of a new tracking period. In other words, the cache memory manager may reset the higher level cache hit counter 806 for a miss of the cache line 802 in the higher level cache memory 800. In various aspects, the higher level cache hit counter 806 may be updated using various algorithms and/or operations.

In response to an eviction of the cache line 802 from the higher level cache memory 800, the cache memory manager may update the lower level cache hit counter 810. The cache memory manager may increase the lower level cache hit counter 810 based on a value of the higher level cache hit counter 806 of the cache line 802 exceeding an update threshold at the time of the eviction of the cache line 802 from the higher level cache memory 800. The update threshold may be configured as a value for indicating a number of hits of the cache line 802 in the higher level cache memory 800 during a tracking period. In various aspects, the lower level cache hit counter 810 may be updated using various algorithms and/or operations.

In response to an access of the cache line 802 in the higher level cache memory 800 and based on a value of the lower level cache hit counter 810, the cache memory manager may set the high locality indicator 808 at the beginning of a new tracking period. In other words, the cache memory manager may set the high locality indicator 808 in response to a miss of the cache line 802 in the higher level cache memory 800 and a value of the lower level cache hit counter 810 of the cache line 802 exceeding a lower level cache locality threshold. The lower level cache locality threshold may be configured as a value for indicating a number of hits of the cache line 802 in the higher level cache memory 800 across any number of tracking periods. Setting the high locality indicator 808 may include writing a "1" value to the high locality indicator field of the cache line 802 to indicate that the cache line 802 has high locality, and resetting the high locality indicator 808 may include writing a "0" value to the high locality indicator field of the cache line 802 to indicate that the cache line 802 does not have high locality. In various aspects, for an accessed high locality indicator 808 that is already the value for setting and/or resetting the high locality indicator 808, the cache memory manager may maintain the value of the high locality indicator 808 by setting and/or resetting the high locality indicator 808, and/or by skipping setting and/or resetting the high locality indicator 808.

In response to the cache memory manager setting the high locality indicator 808, the cache memory manager may reset the lower level cache hit counter 810. Resetting the lower level cache hit counter 810 may include writing a "00" value to the lower level cache hit counter field of the cache line 802.

In response to a selection of the cache line 802 as a victim cache line candidate in the higher level cache memory 800 and based on the high locality indicator 808 being set, the cache memory manager may update the higher level cache hit counter 806. The cache memory manager may increase the higher level cache hit counter 806 in response to the selection of the cache line 802 as a victim cache line candidate in the higher level cache memory 800 and the set high locality indicator 808 during a tracking period. In various aspects, the higher level cache hit counter 806 may be updated using various algorithms and/or operations.

In response to a selection of the cache line 802 as a victim cache line candidate in the higher level cache memory 800 and based on a value of the higher level cache hit counter 806, the cache memory manager may reset the high locality indicator 808. The cache memory manager may reset the high locality indicator 808 in response to the selection of the cache line 802 as a victim cache line candidate in the higher level cache memory 800 and the higher level cache hit counter 806 exceeding a replace threshold. The replace threshold may be configured as a value for indicating a number of selections of the cache line 802 in the higher level cache memory 800 as a victim cache line candidate during a tracking period.

The descriptions of the higher level cache memory 800, the lower level cache memory 820, the cache line 802, the higher level cache hit counter 806, the high locality indicator 808, and the lower level cache hit counter 810 also apply for like numbered elements shown in FIGS. 8B-8K. In various aspects, a cache line 802 inserted into the higher level cache memory 800 and/or the lower level cache memory 820 from another memory (e.g., memory 16, 24 in FIG. 1) may include a "00" value for the higher level cache memory 800 and the lower level cache hit counter 810, and a "0" value (i.e., not having high locality) for the high locality indicator 808.

Figure 8B:
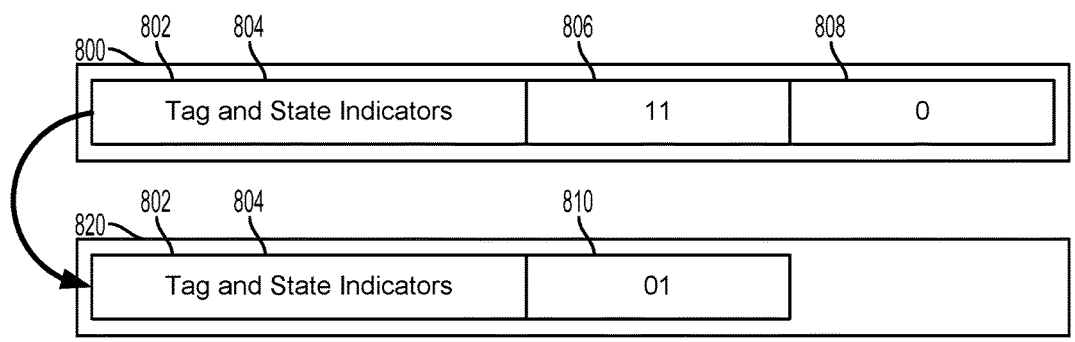

FIG. 8B illustrates the example cache memory hierarchy system configured to retain high locality data in a higher level cache memory in which the cache line 802 is evicted from the higher level cache memory 800, and the lower level cache hit counter 810 may be updated. The cache line 802 may be stored in the higher level cache memory 800 and accessed during a tracking period prompting the cache memory manager to update the higher level cache hit counter 806. Access to the cache line 802 in the higher level cache 800 may be counted through updating the higher level cache hit counter 806, for example, by increasing a value of the higher level cache hit counter 806. Eviction of the cache line 802 from the higher level cache memory 800 may prompt the cache memory manager to check and compare the higher level cache hit counter 806 to the update threshold. In response to the higher level cache hit counter 806 exceeding the update threshold, the cache memory manager may update the lower level cache hit counter 810, for example, by increasing a value of the lower level cache hit counter 810.

In the example illustrated in FIG. 8B, the cache line 802 in the higher level cache memory 800 may include the higher level cache hit counter 806 exceeding the update threshold (e.g., higher level cache hit counter 806 may have the value "11" exceeding a update threshold value of "10"), and the not set, or reset, higher level cache hit counter 806 indicating that the cache line 802 does not have high locality. The cache line 802 may be evicted from the higher level cache memory 800. In response to the eviction of the cache line 802 from the higher level cache memory 800, the cache memory manager may compare the higher level cache hit counter 806 to the update threshold and determine that the higher level cache hit counter 806 exceeds (or equals) the update threshold, and the cache memory manager may update the lower level cache hit counter 810 in response (e.g., increasing a value of the lower level cache hit counter 810 from "00" to "01").

Figure 8C:
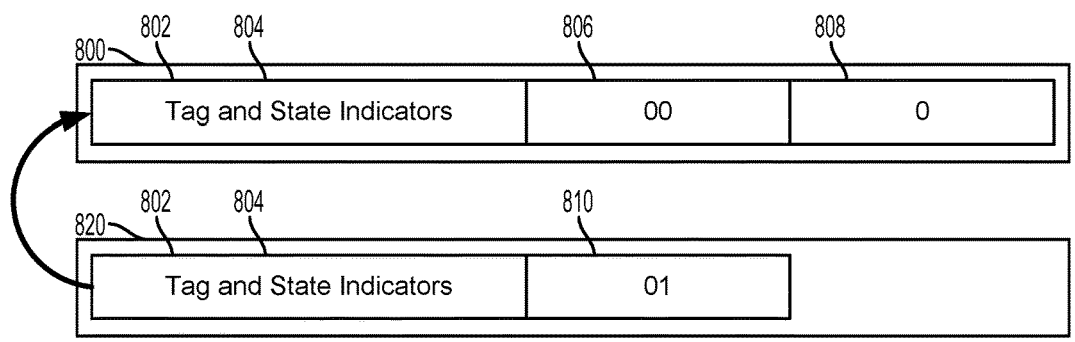

FIG. 8C illustrates the example cache memory hierarchy system configured to retain high locality data in a higher level cache memory in which the cache line 802 is accessed in the higher level cache memory 800 following being evicted from the higher level cache memory 800 and the cache line 802 is updated in the higher level cache memory 800. Access of the cache line 802 in the higher level cache memory 800 may result in a miss in the higher level cache memory 800 following eviction of the cache line 802 from the higher level cache memory 800. The miss may prompt the cache memory manager to retrieve the cache line 802 from the lower level cache memory 820 and send it to the higher level cache memory 800, and/or update the cache line 802 in the higher level cache memory 800. Updating the cache line 802 in the higher level cache memory 800 may include resetting the higher level cache hit counter 806. Updating the cache line 802 in the higher level cache memory 800 may also include the cache memory manager to checking and comparing the lower level cache hit counter 810 to the lower level cache locality threshold. In response to the lower level cache hit counter 810 not exceeding the lower level cache locality threshold, the cache memory manager may update the high locality indicator 808, for example, by resetting, or maintaining, the high locality indicator 808.

In the example illustrated in FIG. 8C, the cache line 802 in the higher level cache memory 800 may initially have any value of higher level cache hit counter 806 (e.g., the higher level cache hit counter 806 may have the value "11") and a not set, or reset, high locality indicator 808, for example, as described for the example illustrated in FIG. 8B. The access of the cache line 802 in the higher level cache memory 800 may prompt the cache memory manager to reset the higher level cache hit counter 806, for example, by changing the value of higher level cache hit counter 806 from "11" to "00". The access of the cache line 802 in the higher level cache memory 800 may prompt the cache memory manager to compare the compare the lower level cache hit counter 810 to the lower level cache locality threshold and determine that the lower level cache hit counter 810 does not exceed (or equals) the lower level cache locality threshold (e.g., lower level cache hit counter 810 may have the value "01" not exceeding a lower level cache locality threshold value of "10"). In response, the cache memory manager may reset, or maintain, the high locality indicator 808, for example, by making the high locality indicator 808 a "0" value or maintaining the high locality indicator 808 as a "0" value.

Figure 8D:
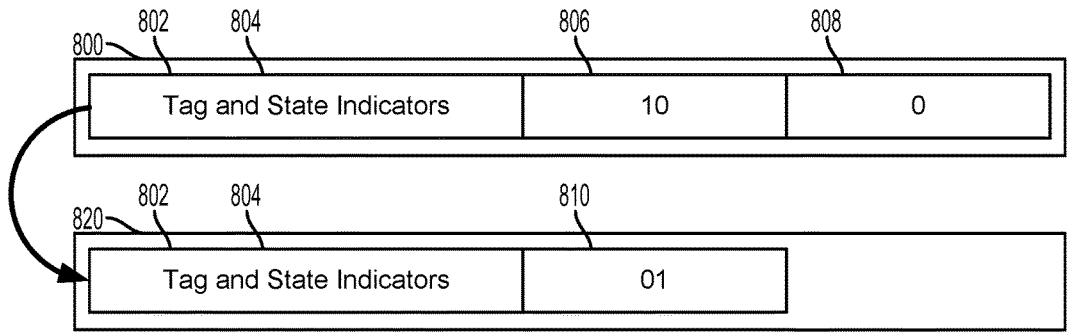

FIG. 8D illustrates the example cache memory hierarchy system configured to retain high locality data in a higher level cache memory in which the cache line 802 is evicted from the higher level cache memory 800, and the lower level cache hit counter 810 may be maintained. The cache line 802 may be stored in the higher level cache memory 800 and accessed during a tracking period prompting the cache memory manager to update the higher level cache hit counter 806. Access to the cache line 802 in the higher level cache 800 may be counted through updating the higher level cache hit counter 806, for example, by increasing a value of the higher level cache hit counter 806. Eviction of the cache line 802 from the higher level cache memory 800 may prompt the cache memory manager to check and compare the higher level cache hit counter 806 to the update threshold. In response to the higher level cache hit counter 806 not exceeding the update threshold, the cache memory manager may maintain the lower level cache hit counter 810, for example, by not changing a value of the lower level cache hit counter 810.

In the example illustrated in FIG. 8D, the cache line 802 in the higher level cache memory 800 may include the higher level cache hit counter 806 not exceeding the update threshold (e.g., higher level cache hit counter 806 may have the value "10" not exceeding an update threshold value of "10"), and the not set, or reset, higher level cache hit counter 806 indicating that the cache line 802 does not have high locality. The cache line 802 may be evicted from the higher level cache memory 800. In response to the eviction of the cache line 802 from the higher level cache memory 800, the cache memory manager may compare the higher level cache hit counter 806 to the update threshold and determine that the higher level cache hit counter 806 does not exceed (or equals) the update threshold, and the cache memory manager may maintain the lower level cache hit counter 810 in response (e.g., maintaining a value of the lower level cache hit counter 810 of "01", as described for the example illustrated in FIG. 8B).

Figure 8E:
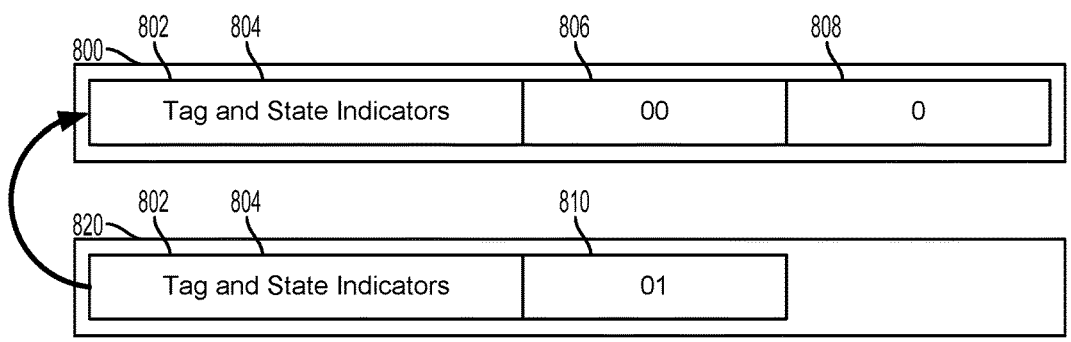

FIG. 8E illustrates the example cache memory hierarchy system configured to retain high locality data in a higher level cache memory in which the cache line 802 is accessed in the higher level cache memory 800 following being evicted from the higher level cache memory 800 and the cache line 802 is updated in the higher level cache memory 800. Access of the cache line 802 in the higher level cache memory 800 may result in a miss in the higher level cache memory 800 following eviction of the cache line 802 from the higher level cache memory 800. The miss may prompt the cache memory manager to retrieve the cache line 802 from the lower level cache memory 820 and send it to the higher level cache memory 800, and/or update the cache line 802 in the higher level cache memory 800. Updating the cache line 802 in the higher level cache memory 800 may include resetting the higher level cache hit counter 806. Updating the cache line 802 in the higher level cache memory 800 may also include the cache memory manager to checking and comparing the lower level cache hit counter 810 to the lower level cache locality threshold. In response to the lower level cache hit counter 810 not exceeding the lower level cache locality threshold, the cache memory manager may update the high locality indicator 808, for example, by resetting, or maintaining, the high locality indicator 808.

In the example illustrated in FIG. 8E, the cache line 802 in the higher level cache memory 800 may initially have any value of higher level cache hit counter 806 (e.g., the higher level cache hit counter 806 may have the value "10") and a not set, or reset, high locality indicator 808, for example, as described for the example illustrated in FIG. 8D. The access of the cache line 802 in the higher level cache memory 800 may prompt the cache memory manager to reset the higher level cache hit counter 806, for example, by changing the value of higher level cache hit counter 806 from "10" to "00". The access of the cache line 802 in the higher level cache memory 800 may prompt the cache memory manager to compare the compare the lower level cache hit counter 810 to the lower level cache locality threshold and determine that the lower level cache hit counter 810 does not exceed (or equals) the lower level cache locality threshold (e.g., lower level cache hit counter 810 may have the value "01" not exceeding a lower level cache locality threshold value of "10"). In response, the cache memory manager may reset, or maintain, the high locality indicator 808, for example, by making the high locality indicator 808 a "0" value or maintaining the high locality indicator 808 as a "0" value.

Figure 8F:
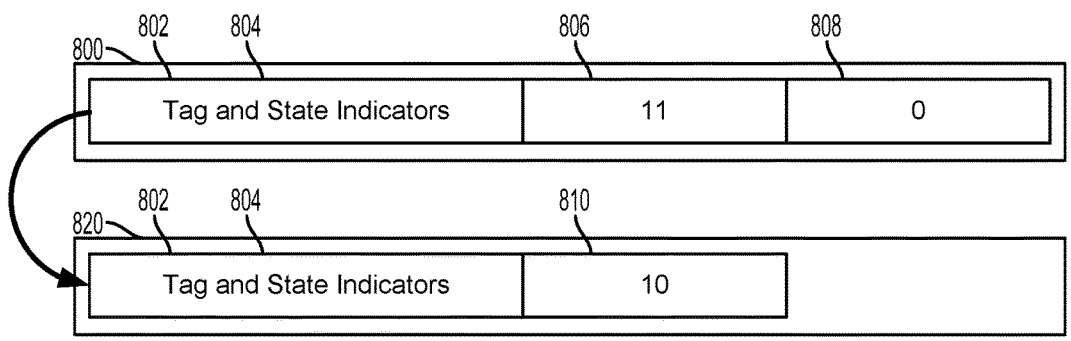

FIG. 8F illustrates the example cache memory hierarchy system configured to retain high locality data in a higher level cache memory in which the cache line 802 is evicted from the higher level cache memory 800, and the lower level cache hit counter 810 may be updated. The cache line 802 may be stored in the higher level cache memory 800 and accessed during a tracking period prompting the cache memory manager to update the higher level cache hit counter 806. Access to the cache line 802 in the higher level cache 800 may be counted through updating the higher level cache hit counter 806, for example, by increasing a value of the higher level cache hit counter 806. Eviction of the cache line 802 from the higher level cache memory 800 may prompt the cache memory manager to check and compare the higher level cache hit counter 806 to the update threshold. In response to the higher level cache hit counter 806 exceeding the update threshold, the cache memory manager may update the lower level cache hit counter 810, for example, by increasing a value of the lower level cache hit counter 810.

In the example illustrated in FIG. 8F, the cache line 802 in the higher level cache memory 800 may include the higher level cache hit counter 806 exceeding the update threshold (e.g., higher level cache hit counter 806 may have the value "11" exceeding a update threshold value of "10"), and the not set, or reset, higher level cache hit counter 806 indicating that the cache line 802 does not have high locality. The cache line 802 may be evicted from the higher level cache memory 800. In response to the eviction of the cache line 802 from the higher level cache memory 800, the cache memory manager may compare the higher level cache hit counter 806 to the update threshold and determine that the higher level cache hit counter 806 exceeds (or equals) the update threshold, and the cache memory manager may update the lower level cache hit counter 810 in response (e.g., increasing a value of the lower level cache hit counter 810 from "01" to "10").

Figure 8G:
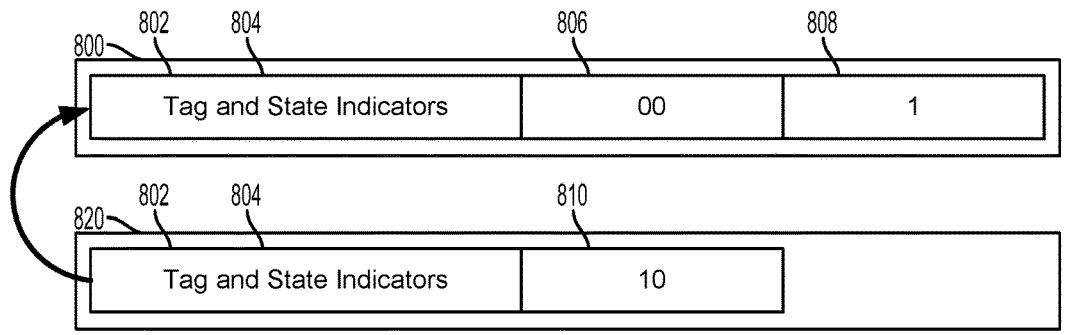

FIG. 8G illustrates the example cache memory hierarchy system configured to retain high locality data in a higher level cache memory in which the cache line 802 is accessed in the higher level cache memory 800 following being evicted from the higher level cache memory 800 and the cache line 802 is updated in the higher level cache memory 800. Access of the cache line 802 in the higher level cache memory 800 may result in a miss in the higher level cache memory 800 following eviction of the cache line 802 from the higher level cache memory 800. The miss may prompt the cache memory manager to retrieve the cache line 802 from the lower level cache memory 820 and send it to the higher level cache memory 800, and/or update the cache line 802 in the higher level cache memory 800. Updating the cache line 802 in the higher level cache memory may include resetting the higher level cache hit counter 806. Updating the cache line 802 in the higher level cache memory 800 may also include the cache memory manager to checking and comparing the lower level cache hit counter 810 to the lower level cache locality threshold. In response to the lower level cache hit counter 810 exceeding the lower level cache locality threshold, the cache memory manager may update the high locality indicator 808, for example, by setting the high locality indicator 808.

In the example illustrated in FIG. 8G, the cache line 802 in the higher level cache memory 800 may initially have any value of higher level cache hit counter 806 (e.g., the higher level cache hit counter 806 may have the value "11") and a not set, or reset, high locality indicator 808, for example, as described for the example illustrated in FIG. 8F. The access of the cache line 802 in the higher level cache memory 800 may prompt the cache memory manager to reset the higher level cache hit counter 806, for example, by changing the value of higher level cache hit counter 806 from "11" to "00". The access of the cache line 802 in the higher level cache memory 800 may prompt the cache memory manager to compare the compare the lower level cache hit counter 810 to the lower level cache locality threshold and determine that the lower level cache hit counter 810 exceeds (or equals) the lower level cache locality threshold (e.g., lower level cache hit counter 810 may have the value "10" equaling a lower level cache locality threshold value of "10"). In response, the cache memory manager may set the high locality indicator 808, for example, by making the high locality indicator 808 a "1" value, indicating the cache line 802 has high locality.

Figure 8H:
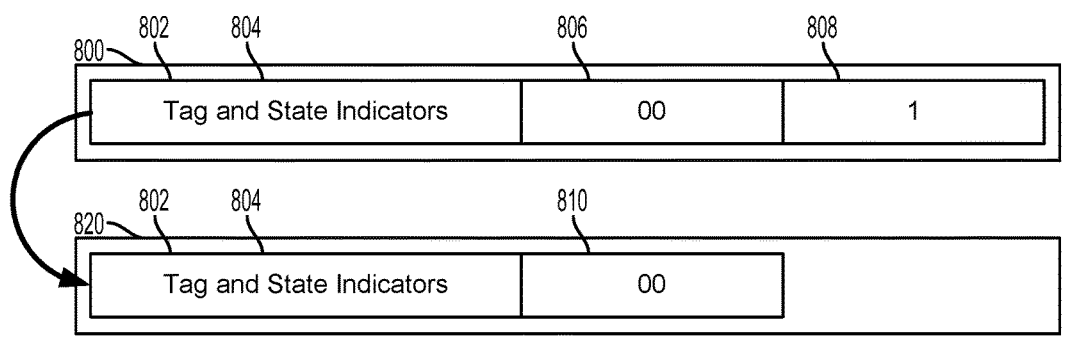

FIG. 8H illustrates the example cache memory hierarchy system configured to retain high locality data in a higher level cache memory in which a set cache line high locality indicator signal may be sent in response to setting the high locality indicator 808 of the cache line 802. In various aspects, the lower level cache hit counter 810 may be used to determine whether to set the high locality indicator 808, as described for the example illustrated in FIG. 8G. The lower level cache hit counter 810 may be reset for the set high locality indicator 808. The cache memory manager may be prompted by setting the high locality indicator 808 to reset the lower level cache hit counter 810, for example by a set cache line high locality indicator signal.

In the example illustrated in FIG. 8H, the cache line 802 in the higher level cache memory 800 may include a set locality indicator 808, for example, as described for the example illustrated in FIG. 8G. The locality indicator 808 may be set as a consequence of an access to the cache line 802 in the higher level cache memory 800 that results in a miss, as described for the example illustrated in FIG. 8G. Setting the locality indicator 808 may prompt generating and sending a set cache line high locality indicator signal configured to indicate to the cache memory manager that the locality indicator 808 is set. The set cache line high locality indicator signal may prompt the cache memory manager to reset the lower level cache hit counter 810, for example, by making the lower level cache hit counter 810 a "00" value.

Figure 8I:
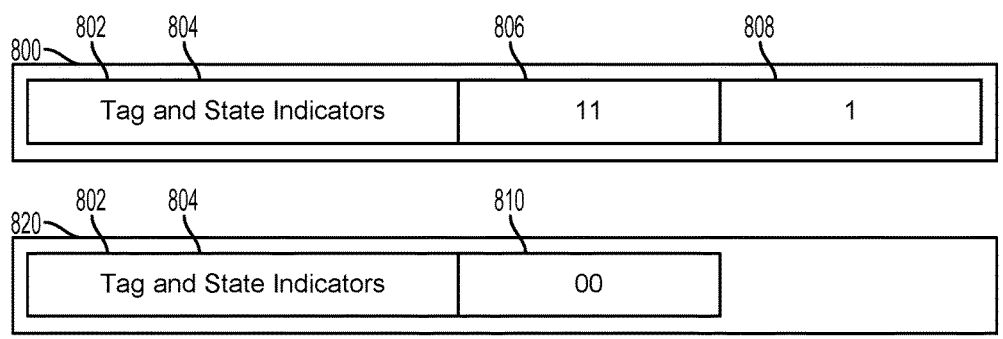
Figure 8J:
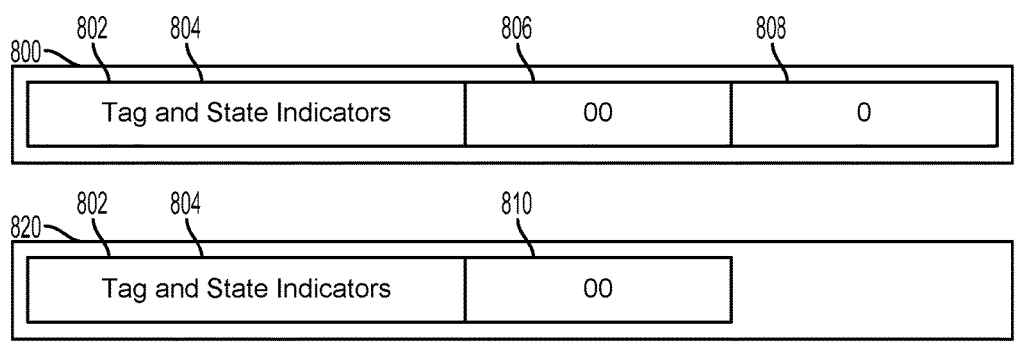

FIG. 8I illustrates the example cache memory hierarchy system configured to retain high locality data in a higher level cache memory in which higher level cache hit counter 806 may be updated in response to a selection of the cache line 802 in the higher level cache memory 800 as a victim cache line candidate. As discussed herein, the cache line 802 may be pinned to the higher level cache memory 800 by having a locality indicator 808. A pinned cache line 802 may not be evicted from the higher level cache memory 800. The cache line 802 may remain pinned to the higher level cache memory 800 while the locality indicator 808 is set. While the cache line 802 is pinned to the higher level cache memory 800 by having the set locality indicator 808, the cache memory manager may update and analyze the higher level cache hit counter 806 in a different manner than when the cache line 802 is unpinned from the higher level cache memory 800 by having the not set, or reset, locality indicator 808. As described herein, when the cache line 802 is unpinned from the higher level cache memory 800, the cache memory manager may update and analyze the higher level cache hit counter 806 as it relates to a number of access of the cache line 802 in the higher level cache memory 800 during a tracking period. When the cache line 802 is pinned to the higher level cache memory 800, the cache memory manager may update and analyze the higher level cache hit counter 806 as it relates to a number of selections of the cache line 802 in the higher level cache memory 800 as a victim cache line candidate for eviction from the higher level cache memory 800 during a tracking period. The cache line 802 may be stored in the higher level cache memory 800 and selected as a victim cache line candidate for eviction during a tracking period according to any eviction policy and criteria, such as least recently used, not most recently used, first in first out, etc. Selection of the cache line 802 as a victim cache line candidate in the higher level cache memory 800 may prompt the cache memory manager to check the locality indicator 808 to determine whether the locality indicator 808 is set. Selection of the cache line 802 as a victim cache line candidate in the higher level cache memory 800 and determining that the locality indicator 808 is set may prompt the cache memory manager to update the higher level cache hit counter 806. Selection of the cache line 802 as a victim cache line candidate in the higher level cache 800 may be counted through updating the higher level cache hit counter 806, for example, by increasing a value of the higher level cache hit counter 806.

In the example illustrated in FIG. 8I, the cache line 802 in the higher level cache memory 800 may initially have any value of higher level cache hit counter 806 (e.g., the higher level cache hit counter 806 may have the value "10") and a set high locality indicator 808. The initial value of the higher level cache hit counter 806 may indicate a number of previous selections of the cache line 802 in the higher level cache memory 800 as a victim cache line candidate. An additional selection of the of the cache line 802 in the higher level cache memory 800 as a victim cache line candidate to may prompt the cache memory manager determine whether the high locality indicator 808 is set. In response to determining that the set high locality indicator 808 is set, the cache memory manager may update the higher level cache hit counter 806, for example, by increasing the value of the higher level cache hit counter 806 (e.g., increasing a value of the higher level cache hit counter 806 from "10" to "11").

FIG. 8K illustrates the example cache memory hierarchy system configured to retain high locality data in a higher level cache memory in which higher level cache hit counter 806 may be updated in response to a selection of the cache line 802 in the higher level cache memory 800 as a victim cache line candidate. As the cache line 802 may be pinned to the higher level cache memory 800, the cache line 802 may also be unpinned from the higher level cache memory 800. In response to updating the higher level cache hit counter 806 for a selection of the cache line 802 as a victim cache line candidate in the higher level cache 800, the cache memory manager may be prompted to compare the higher level cache hit counter 806 to a replace threshold. In response to the higher level cache hit counter 806 exceeding the replace threshold, the cache memory manager may update the lower level cache hit counter 810, for example, by resetting the lower level cache hit counter 810, and reset the high locality indicator 808. Resetting the high locality indicator 808 may allow the cache memory manager to evict the cache line 802 from the higher level cache memory 800 in response to a subsequent selection as a victim cache line candidate, thereby unpinning the cache line 802 from the higher level cache memory 800.

In the example illustrated in FIG. 8K, the cache line 802 in the higher level cache memory 800 may initially have any value of higher level cache hit counter 806 (e.g., the higher level cache hit counter 806 may have the value "11") and a set high locality indicator 808, as described for the example illustrated in FIG. 8I. The initial value of the higher level cache hit counter 806 may indicate a number of previous selections of the cache line 802 in the higher level cache memory 800 as a victim cache line candidate. The update to the higher level cache hit counter 806, as described for the example illustrated in FIG. 8I, may prompt the cache memory manager to compare the higher level cache hit counter 806 to the replace threshold and determine that the higher level cache hit counter 806 exceeds (or equals) the replace threshold (e.g., higher level cache hit counter 806 may have the value "11" exceeding a replace threshold value of "10"). In response to determining that the higher level cache hit counter 806 exceeds (or equals) the replace threshold the cache memory manager may update the higher level cache hit counter 806, for example, by resetting the value of the higher level cache hit counter 806 (e.g., resetting a value of the higher level cache hit counter 806 to "00"). In response to determining that the higher level cache hit counter 806 exceeds (or equals) the replace threshold the cache memory manager may reset the high locality indicator 808, for example, by making the high locality indicator 808 a "0" value.

Figure 9:
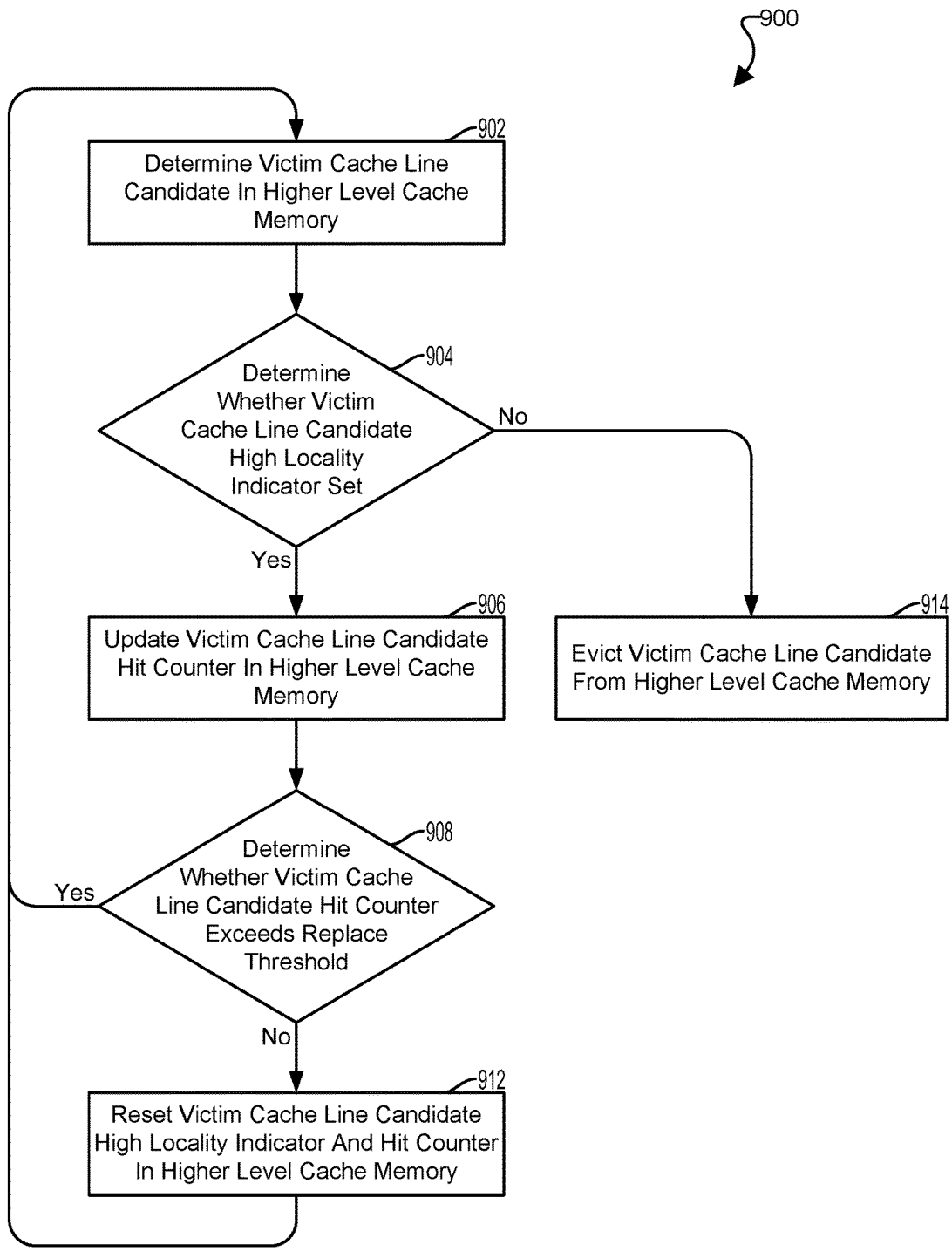
FIG. 9 is a process flow diagram illustrating a method for finding a victim cache line candidate in a higher level cache memory for retaining high locality data in the higher level cache memory according to an aspect.

FIG. 9 illustrates a method 900 for finding a victim cache line candidate in a higher level cache memory for retaining high locality data in the higher level cache memory according to an aspect. The method 900 may be implemented in a computing device in software executing in a processor (e.g., processor 14 in FIGS. 1 and 2), in general purpose hardware, in dedicated hardware (e.g., cache memory manager 250 in FIG. 2), or in a combination of a software-configured processor and dedicated hardware (e.g., processor 14 in FIGS. 1 and 2 and cache memory manager 250 in FIG. 2), such as a processor executing software within a cache memory hierarchy management system (e.g., cache memory hierarchy system in FIGS. 8A-8K) that includes other individual components (e.g., memory 16, 24 in FIG. 1, higher level cache memory 800, lower level cache memory 820 in FIGS. 8A-8K), and various memory/cache controllers. In order to encompass the alternative configurations enabled in various aspects, the hardware implementing the method 900 is referred to herein as a "processing device." The method 900 includes operations that may be involved in finding a victim cache line candidate in the higher level cache memory in block 312 of the method 300 as described with reference to FIG. 3.

In block 902, the processing device may determine the victim cache line candidate in the higher level cache memory. In various aspects, the processing device may use any eviction policy based on any eviction criteria, such as least recently used, not most recently used, first in first out, etc., to determine the victim cache line candidate.

In determination block 904, the processing device may determine whether the victim cache line candidate high locality indicator (e.g., high locality indicator 808 in FIGS. 8A-8K) is set. The processing device may access the victim cache line candidate in the higher level cache memory and check a high locality indicator field of the victim cache line candidate for the high locality indicator. The processing device may determine from the high locality indicator whether the high locality indicator is set or not set, or reset. For example, as discussed herein, a value of a binary format high locality indicator="1" may indicate that the high locality indicator is set indicating that the cache line has high locality, and a value of the binary format high locality indicator="0" may indicate that the accessed indicator is not set, or reset, indicating that the cache line does not have high locality.

In response to determining that the victim cache line candidate high locality indicator is set (i.e., determination block 904="Yes"), the processing device may update the higher level cache hit counter (e.g., higher level cache hit counter 806 in FIGS. 8A-8K) for the victim cache line candidate in higher level cache memory in block 906. In various aspects, the higher level cache hit counter may be configured to indicate a number and/or a representation of a number of selections of the cache line in the higher level cache memory as a victim cache line candidate during a tracking period. A representation of a number may include a representation of a range of numbers. In various aspects, indicating a selection as a victim cache line candidate may include changing a value of the higher level cache hit counter in a manner that indicates at least one more selection of the cache line in the higher level cache memory as a victim cache line candidate. The processing device may access the cache line in the higher level cache memory and write a value to the higher level cache hit counter field of the cache line to update the higher level cache hit counter. For example, as discussed herein, a value of a binary higher level cache hit counter may indicate a number of selections of the cache line in the higher level cache memory as a victim cache line candidate, and an increased value of the binary higher level cache hit counter may indicate a greater number of selections of the cache line in the higher level cache memory as a victim cache line candidate. The processing device may use any algorithms and/or operations to update the higher level cache hit counter of the cache line in the higher level cache memory.

In determination block 908, the processing device may determine whether the higher level cache hit counter of the victim cache line candidate exceeds a replace threshold. In various aspects, the replace threshold may be a value representing a limit of times a cache line pinned to the higher level cache memory may be selected before being unpinned from the higher level cache memory. The processing device may compare the higher level cache hit counter of the victim cache line candidate and the replace threshold to determine a relationship between the higher level cache hit counter and the replace threshold, such as whether the higher level cache hit counter exceeds or does not equal or exceed the replace threshold.

In response to determining that the higher level cache hit counter of the victim cache line candidate does not exceed the replace threshold (i.e. determination block 908="No"), the processing device may reset the victim cache line candidate high locality indicator and higher level cache hit counter in higher level cache memory in block 912. The processing device may access the victim cache line candidate in the higher level cache memory and write designated values to the high locality indicator field and the higher level cache hit counter field of the victim cache line candidate to reset the high locality indicator and the higher level cache hit counter. For example, as discussed herein, a value of the binary format high locality indicator="0" may indicate that the high locality indicator is not set, or reset. Also, as discussed herein, a value of the binary format higher level cache hit counter="00" may indicate that the higher level cache hit counter is not set, or reset.

After resetting the victim cache line candidate high locality indicator and higher level cache hit counter in higher level cache memory or in response to determining that the higher level cache hit counter of the victim cache line candidate exceeds the replace threshold (i.e. determination block 908="Yes"), the processing device may determine another victim cache line candidate in the higher level cache memory in block 902. The processing device using the same eviction policy may select a next victim cache line candidate in the higher level cache memory based on the eviction criteria. For example, the processing device may execute the eviction policy using an eviction queue in which victim cache line candidates are ordered according to the eviction criteria, and a next victim cache line candidate may be a victim cache line candidate in a next position in the eviction queue. In various aspects, the eviction queue may be implemented using memory, such as a register, and/or data structure having ordered identifiers for each victim cache line candidate in the eviction queue. In various aspects, the eviction queue may be implemented by assigning each victim cache line candidate a value indicating an order for eviction.

In response to determining that the victim cache line candidate high locality indicator is not set (i.e., determination block 904="No"), the processing device may evict the victim cache line candidate from the higher level cache memory in block 914. In various aspects, the processing device may evict the victim cache line candidate by marking the victim cache line candidate invalid in the higher level cache memory, by removing the victim cache line candidate from the higher level cache memory, and/or overwriting the victim cache line candidate in the higher level cache memory.

Figure 10:
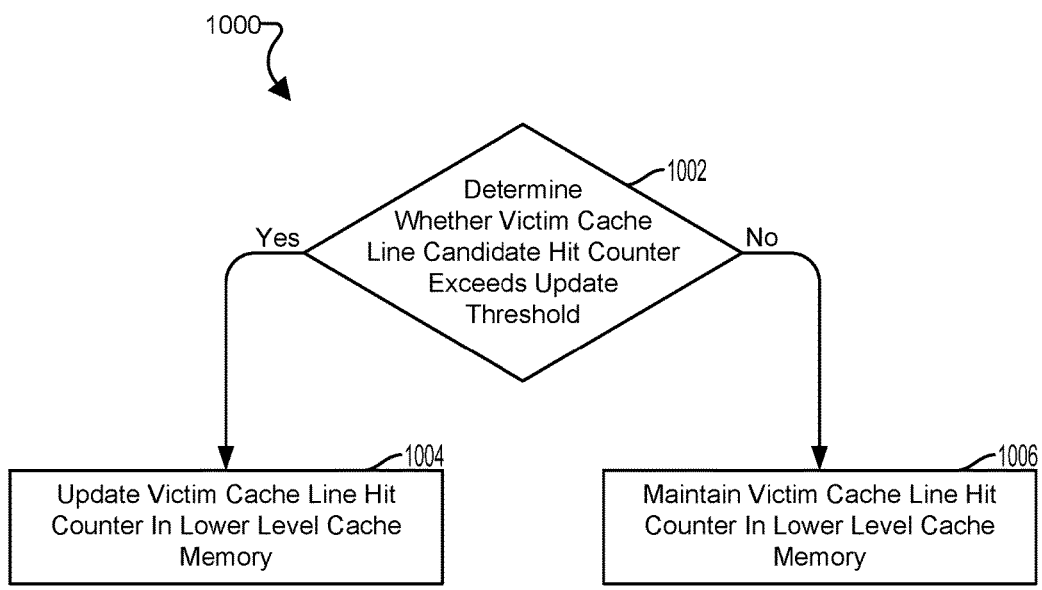
FIG. 10 is a process flow diagram illustrating a method for updating a lower level cache memory for retaining high locality data in a higher level cache memory according to an aspect.

FIG. 10 illustrates a method 1000 for updating a lower level cache memory for retaining high locality data in a higher level cache memory according to an aspect. The method 1000 may be implemented in a computing device in software executing in a processor (e.g., processor 14 in FIGS. 1 and 2), in general purpose hardware, in dedicated hardware (e.g., cache memory manager 250 in FIG. 2), or in a combination of a software-configured processor and dedicated hardware (e.g., processor 14 in FIGS. 1 and 2 and cache memory manager 250 in FIG. 2), such as a processor executing software within a cache memory hierarchy management system (e.g., cache memory hierarchy system in FIGS. 8A-8K) that includes other individual components (e.g., memory 16, 24 in FIG. 1, higher level cache memory 800, lower level cache memory 820 in FIGS. 8A-8K), and various memory/cache controllers. In order to encompass the alternative configurations enabled in various aspects, the hardware implementing the method 1000 is referred to herein as a "processing device." In various aspects, the method 1000 may be prompted by evicting the victim cache line candidate from the higher level cache memory in block 914 of the method 900 described with reference to FIG. 9.

In determination block 1002, the processing device may determine whether the higher level cache hit counter (e.g., higher level cache hit counter 806 in FIGS. 8A-8K) for the victim cache line candidate exceeds an update threshold. In various aspects, the update threshold may be a value representing a number of times a cache line in the higher level cache memory may be accessed to prompt updating a lower level cache hit counter (e.g., lower level cache hit counter 810 in FIGS. 8A-8K) for the cache line in the lower level cache memory corresponding to the victim cache line candidate in the higher level cache memory. The cache line in the lower level cache memory corresponding to the victim cache line candidate in the higher level cache memory is also referred to herein as the victim cache line candidate in the lower level cache memory. The processing device may compare the higher level cache hit counter of the victim cache line candidate and the update threshold to determine a relationship between the higher level cache hit counter and the update threshold, such as whether the higher level cache hit counter exceeds or does not equal or exceed the update threshold.

In response to determining the higher level cache hit counter for the victim cache line candidate exceeds the update threshold (i.e., determination block 1002="Yes"), the processing device may update the lower level cache hit counter of the victim cache line candidate in lower level cache memory in block 1004. In various aspects, the lower level cache hit counter may be configured to indicate a number and/or a representation of a number of hits of the cache line in the higher level cache memory across any number tracking periods. A representation of a number may include a representation of a range of numbers. In various aspects, indicating a number of hits of the cache line in the higher level cache memory may include changing a value of the lower level cache hit counter in a manner that indicates at least one more hit of the cache line in the higher level cache memory. The processing device may access the victim cache line candidate in the lower level cache memory and write a value to the lower level cache hit counter field of the victim cache line candidate to update the lower level cache hit counter. For example, as discussed herein, a value of a binary lower level cache hit counter may indicate a number of hits of the cache line in the higher level cache memory, and an increased value of the binary lower level cache hit counter may indicate a greater number of hits of the cache line in the higher level cache memory. The processing device may use any algorithms and/or operations to update the lower level cache hit counter of the cache line in the lower level cache memory.

In response to determining the higher level cache hit counter for the victim cache line candidate does not exceed the update threshold (i.e., determination block 1002="No"), the processing device may maintain the lower level cache hit counter of the victim cache line candidate in lower level cache memory in block 1006. In various aspects, the processing device may make no changes to the lower level cache hit counter of the victim cache line candidate in lower level cache memory. In various aspects, the processing device may access the victim cache line candidate in the lower level cache memory and write a value to the lower level cache hit counter field of the victim cache line candidate to that is the same as a current value of the lower level cache hit counter.

Figure 11:
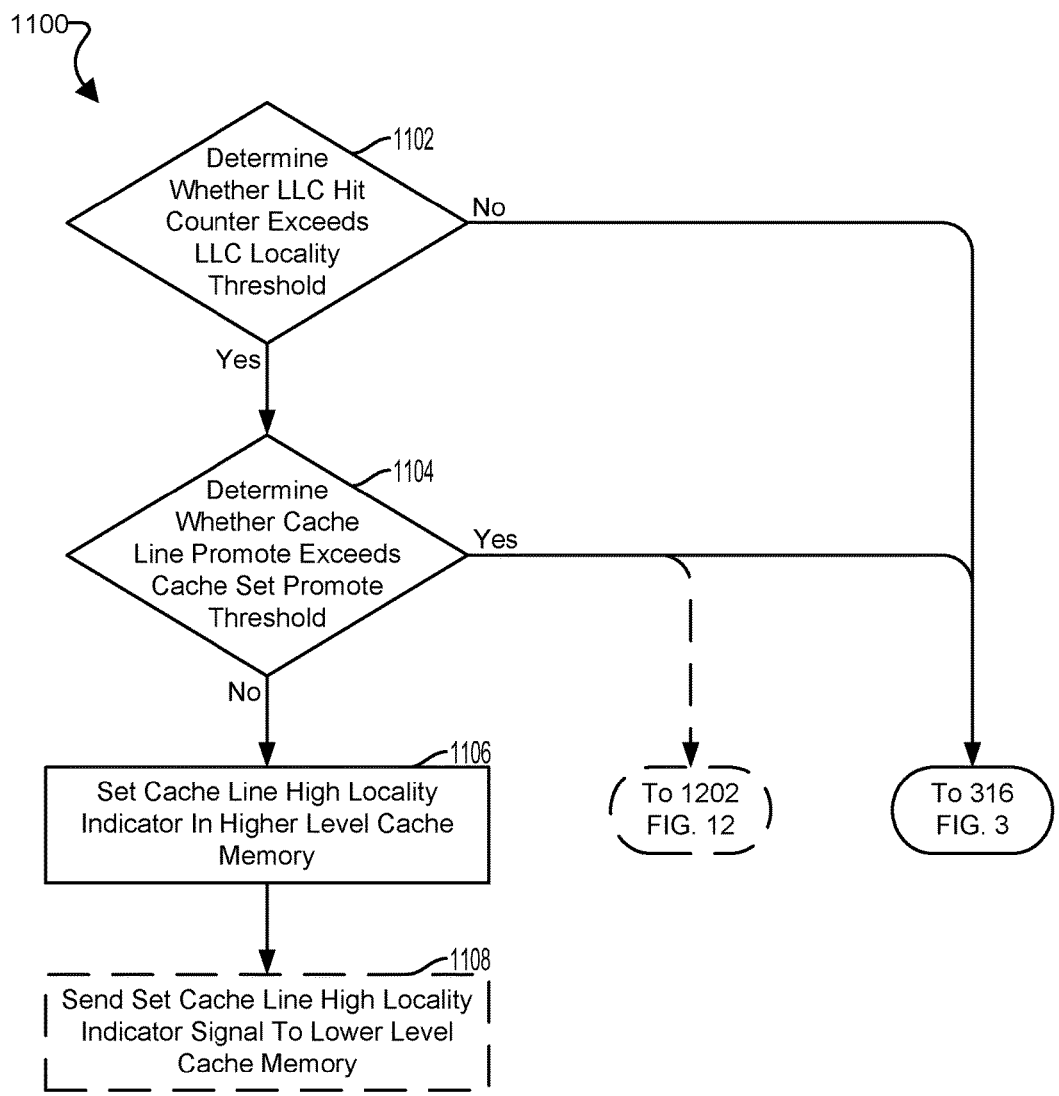
FIG. 11 is a process flow diagram illustrating a method for updating a higher level cache memory for retaining high locality data in the higher level cache memory according to an aspect.

FIG. 11 illustrates a method 1100 for updating a higher level cache memory for retaining high locality data in the higher level cache memory according to an aspect. The method 1100 may be implemented in a computing device in software executing in a processor (e.g., processor 14 in FIGS. 1 and 2), in general purpose hardware, in dedicated hardware (e.g., cache memory manager 250 in FIG. 2), or in a combination of a software-configured processor and dedicated hardware (e.g., processor 14 in FIGS. 1 and 2 and cache memory manager 250 in FIG. 2), such as a processor executing software within a cache memory hierarchy management system (e.g., cache memory hierarchy system in FIGS. 8A-8K) that includes other individual components (e.g., memory 16, 24 in FIG. 1, higher level cache memory 800, lower level cache memory 820 in FIGS. 8A-8K), and various memory/cache controllers. In order to encompass the alternative configurations enabled in various aspects, the hardware implementing the method 1100 is referred to herein as a "processing device." The method 1100 includes operations that may be involved in inserting the retrieved cache line into the higher level cache memory in block 314 of the method 300 described with reference to FIG. 3.

In determination block 1102, the processing device may determine whether the lower level cache (LLC) hit counter (e.g., lower level cache hit counter 810 in FIGS. 8A-8K) of the cache line exceeds a lower level cache locality threshold. In various aspects, the lower level cache locality threshold may be a value representing a number of times a cache line in the higher level cache memory may be accessed to prompt promoting the cache line to a high locality cache line by setting a high locality indicator (e.g., high locality indicator 808 in FIGS. 8A-8K) for the cache line. The processing device may compare the lower level cache hit counter of the cache line and the lower level cache locality threshold to determine a relationship between the lower level cache hit counter and the lower level cache locality threshold, such as whether the lower level cache hit counter exceeds or does not equal or exceed the lower level cache locality threshold.

In response to determining that the lower level cache hit counter exceeds the lower level cache locality threshold (i.e., determination block 1102="Yes"), the processing device may determine whether promoting the cache line to having high locality exceeds a cache set promote threshold. The processing device may limit a number of high locality cache lines in a cache set of the higher level cache memory. The cache lines of a cache set may be promoted to high locality cache lines, and the processing device may track the number of high locality cache lines in the cache set and determine whether promoting a cache line to high locality in the cache set may exceed a cache set promote threshold. The cache set promote threshold may be configured as a limit of the number of high locality cache lines in the cache set. The cache set promote threshold may be configured as a predestinated value and/or a calculated value, such as a percentage of a number of cache lines in the cache set in the higher level cache memory. For example, the cache set promote threshold may be 25% of the cache lines in the cache set. A comparison of a number of cache lines including the high locality cache lines in the cache set plus an additional high locality cache line to the cache set promote threshold resulting in the number of high locality cache lines exceeding the cache set promote threshold may prompt the processing device to determine to not promote the cache line in the higher level cache memory. A comparison of the number of cache lines including the high locality cache lines in the cache set plus an additional the high locality cache line to the cache set promote threshold resulting in the number of the high locality cache lines not exceeding the cache set promote threshold may prompt the processing device to determine to promote the cache line in the higher level cache memory.

In response to determining that promoting the cache line to having high locality does not exceed the cache set promote threshold (i.e., determination block 1104="No"), the processing device may set the cache line high locality indicator in block 1106. The processing device may access the cache line in the higher level cache memory and write a designated value to the high locality indicator field of the cache line to set the high locality indicator. For example, as discussed herein, a value of the binary format high locality indicator="1" may indicate that the high locality indicator is set.

In block optional 1108, the processing device may send a set cache line high locality indicator signal to the lower level cache memory. The set cache line high locality indicator signal may be configured to indicate to the processing device that the locality indicator for the cache line is set. The set cache line high locality indicator signal may prompt the processing device to reset the lower level cache hit counter. Examples of operations that may be involved in reset the lower level cache hit counter are described with reference to the method 1300 illustrated in FIG. 13.

In response to determining that the lower level cache hit counter does not exceed the lower level cache locality threshold (i.e., determination block 1102="No") or in response to determining that promoting the cache line to having high locality exceeds the cache set promote threshold (i.e., determination block 1104="Yes"), the processing device may execute the cache access request for the cache line in the higher level cache memory in block 316 of the method 300 as described with reference to FIG. 3.

Additionally, in response to determining that promoting the cache line to having high locality exceeds the cache set promote threshold (i.e., determination block 1104="Yes"), the processing device may optionally determine whether the lower level hit counter of the cache line exceeds a promote replace threshold in determination block 1202 of the method 1200 described with reference to FIG. 12.

Figure 12:
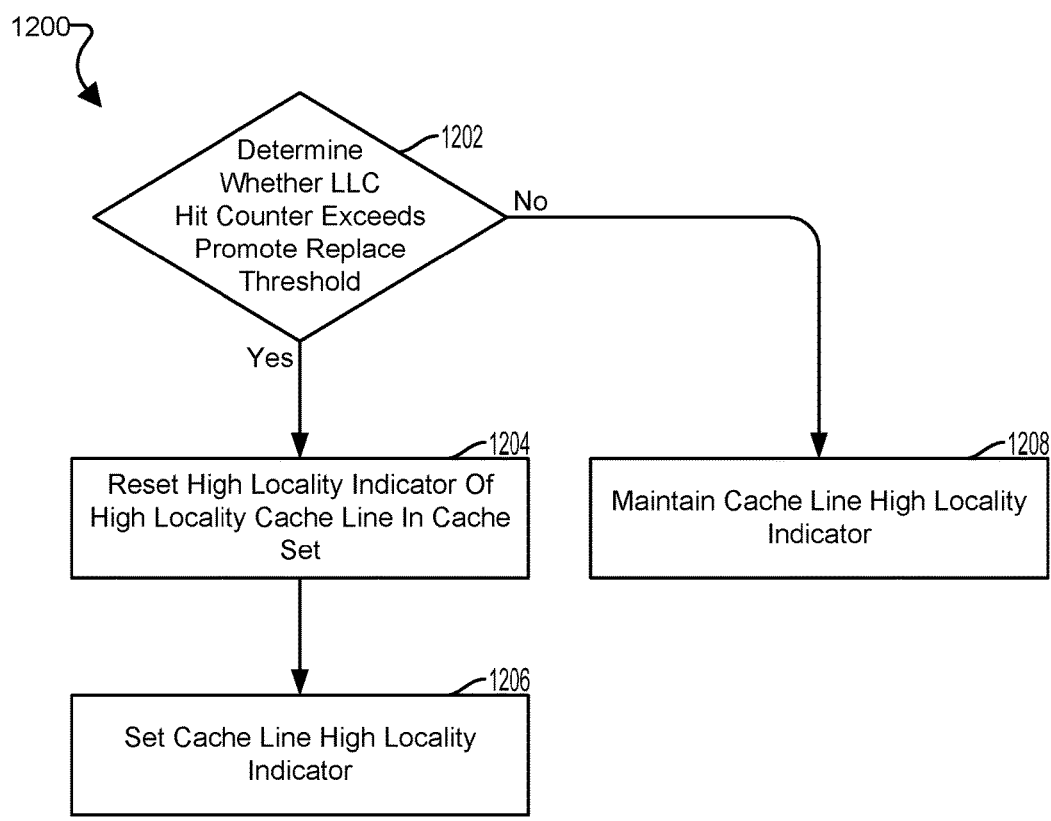
FIG. 12 is a process flow diagram illustrating a method for updating a higher level cache memory for retaining high locality data in the higher level cache memory according to an aspect.

FIG. 12 illustrates a method 1200 for updating a higher level cache memory for retaining high locality data in the higher level cache memory according to an aspect. The method 1200 may be implemented in a computing device in software executing in a processor (e.g., processor 14 in FIGS. 1 and 2), in general purpose hardware, in dedicated hardware (e.g., cache memory manager 250 in FIG. 2), or in a combination of a software-configured processor and dedicated hardware (e.g., processor 14 in FIGS. 1 and 2 and cache memory manager 250 in FIG. 2), such as a processor executing software within a cache memory hierarchy management system (e.g., cache memory hierarchy system in FIGS. 8A-8K) that includes other individual components (e.g., memory 16, 24 in FIG. 1, higher level cache memory 800, lower level cache memory 820 in FIGS. 8A-8K), and various memory/cache controllers. In order to encompass the alternative configurations enabled in various aspects, the hardware implementing the method 1200 is referred to herein as a "processing device."

In determination block 1202 the processing device may determine whether the lower level cache (LLC) hit counter (e.g., lower level cache hit counter 810 in FIGS. 8A-8K) of the cache line exceeds a promote replace threshold. The cache set promote threshold may be configured as a limit of the number of high locality cache lines in the cache set. The promote replace threshold may be a value of cache accesses in the higher level cache memory across any number of tracking periods that may be used to determine whether to replace a high locality cache line in the cache set with the cache line being promoted to high locality. The processing device may compare the lower level cache hit counter of the cache line and the promote replace threshold to determine a relationship between the lower level cache hit counter and the promote replace threshold, such as whether the lower level cache hit counter exceeds or does not equal or exceed the promote replace threshold.

In response to determining that the lower level cache hit counter of the cache line exceeds the promote replace threshold (i.e., determination block 1204="Yes"), the processing device may reset a high locality indicator (e.g., high locality indicator 808 in FIGS. 8A-8K) of a high locality cache line in the cache set. The processing device may access the high locality cache line in the higher level cache memory and write a designated value to the high locality indicator field of the high locality cache line to reset the high locality indicator. For example, as discussed herein, a value of the binary format high locality indicator="0" may indicate that the high locality indicator is not set, or reset. The processing device may select the high locality cache line of the cache set using any criteria, such as the demote threshold as described in determination block 602 of the method 600 described with reference to FIG. 6.

In block 1206, the processing device may set the high locality indicator for the cache line being promoted to high locality. The processing device may access the cache line being promoted in the higher level cache memory and write a designated value to the high locality indicator field of the cache line being promoted to set the high locality indicator. For example, as discussed herein, a value of the binary format high locality indicator="1" may indicate that the high locality indicator is set.

In response to determining that the lower level cache hit counter of the cache line does not exceed the promote replace threshold (i.e., determination block 1204="No"), the processing device may maintain the cache line high locality indicator in block 1208. Maintaining the cache line high locality indicator may result in not promoting the cache line to high locality by maintaining the current value of that cache line high locality indicator and not setting the cache line high locality indicator. In various aspects, the processing device may make no changes to the cache line high locality indicator. In various aspects, the processing device may access the cache line in the higher level cache memory and write a value to the high locality indicator field of the cache line so that is the same as a current value of the high locality indicator.

Figure 13:
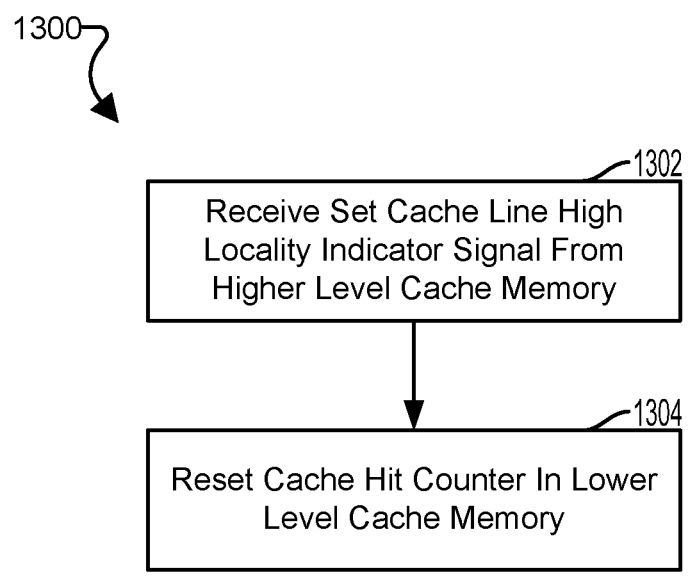
FIG. 13 is a process flow diagram illustrating a method for updating a lower level cache memory for retaining high locality data in a higher level cache memory according to an aspect.

FIG. 13 illustrates a method 1300 for updating a lower level cache memory for retaining high locality data in a higher level cache memory according to an aspect. The method 1300 may be implemented in a computing device in software executing in a processor (e.g., processor 14 in FIGS. 1 and 2), in general purpose hardware, in dedicated hardware (e.g., cache memory manager 250 in FIG. 2), or in a combination of a software-configured processor and dedicated hardware (e.g., processor 14 in FIGS. 1 and 2 and cache memory manager 250 in FIG. 2), such as a processor executing software within a cache memory hierarchy management system (e.g., cache memory hierarchy system in FIGS. 8A-8K) that includes other individual components (e.g., memory 16, 24 in FIG. 1, higher level cache memory 800, lower level cache memory 820 in FIGS. 8A-8K), and various memory/cache controllers. In order to encompass the alternative configurations enabled in various aspects, the hardware implementing the method 1300 is referred to herein as a "processing device."

In block 1302, the processing device may receive a set cache line high locality indicator signal. The set cache line high locality indicator signal may be configured to indicate to the processing device that the locality indicator for the cache line is set in the higher level cache memory. The set cache line high locality indicator signal may prompt the processing device to reset the lower level cache hit counter (e.g., lower level cache hit counter 810 in FIGS. 8A-8K) for the cache line.

In block 1304, the processing device may reset the lower level cache hit counter for the cache line. The processing device may access the cache line in the lower level cache memory and write s designated value to the lower level cache hit counter field of the cache line to reset the lower level cache hit counter. For example, as discussed herein, a value of the binary format lower level cache hit counter="00" may indicate that the lower level cache hit counter is not set, or reset.

Figure 14:
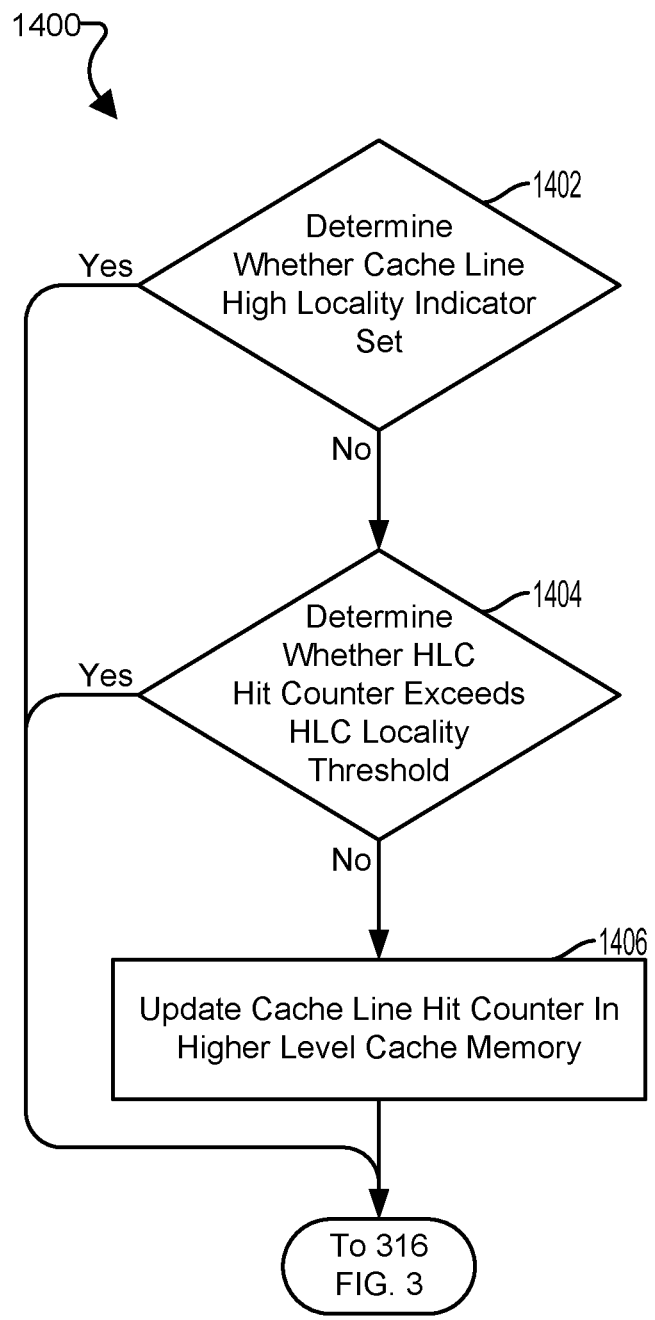
FIG. 14 is a process flow diagram illustrating a method for determining locality of a cache line in a higher level cache memory for retaining high locality data in the higher level cache memory according to an aspect.

FIG. 14 illustrates a method 1400 for determining locality of a cache line in a higher level cache memory for retaining high locality data in the higher level cache memory according to an aspect. The method 1400 may be implemented in a computing device in software executing in a processor (e.g., processor 14 in FIGS. 1 and 2), in general purpose hardware, in dedicated hardware (e.g., cache memory manager 250 in FIG. 2), or in a combination of a software-configured processor and dedicated hardware (e.g., processor 14 in FIGS. 1 and 2 and cache memory manager 250 in FIG. 2), such as a processor executing software within a cache memory hierarchy management system (e.g., cache memory hierarchy system in FIGS. 8A-8K) that includes other individual components (e.g., memory 16, 24 in FIG. 1, higher level cache memory 800, lower level cache memory 820 in FIGS. 8A-8K), and various memory/cache controllers. In order to encompass the alternative configurations enabled in various aspects, the hardware implementing the method 1400 is referred to herein as a "processing device." The method 1400 includes operations that may be involved in determining a locality of the cache line in the higher level cache memory in block 308 of the method 300 described with reference to FIG. 3.

In determination block 1402, the processing device may determine whether the high locality indicator (e.g., high locality indicator 808 in FIGS. 8A-8K) of the cache line is set. The processing device may access the cache line in the higher level cache memory and check a high locality indicator field of the cache line for the high locality indicator. The processing device may determine from the high locality indicator whether the high locality indicator is set or not set, or reset. For example, as discussed herein, a value of a binary format high locality indicator="1" may indicate that the high locality indicator is set indicating that the cache line has high locality, and a value of the binary format high locality indicator="0" may indicate that the accessed indicator is not set, or reset, indicating that the cache line does not have high locality.

In response to determining that the high locality indicator of the cache line is not set (i.e., determination block 1402="No"), the processing device determine whether a higher level cache (HLC) hit counter (e.g., higher level cache hit counter 806 in FIGS. 8A-8K) of the cache line exceeds a higher level cache locality threshold in determination block 1404. In various aspects, the higher level cache locality threshold may be a value representing a limit of a number of hits of the cache line in the higher level cache memory that may be indicated by the higher level cache memory hit counter. The processing device may compare the higher level cache hit counter of the cache line and the higher level cache locality threshold to determine a relationship between the higher level cache hit counter and the higher level cache locality threshold, such as whether the higher level cache hit counter exceeds or does not equal or exceed the higher level cache locality threshold.

In response to determining that the higher level cache hit counter does not exceed the higher level cache locality threshold (i.e., determination block 1404="No"), the processing device may update the higher level cache hit counter in block 1406. In various aspects, the higher level cache hit counter may be configured to indicate a number and/or a representation of a number of hits of the cache line in the higher level cache memory. A representation of a number may include a representation of a range of numbers. In various aspects, indicating a hit of the cache line may include changing a value of the higher level cache hit counter in a manner that indicates at least one more hit of the cache line in the higher level cache memory. The processing device may access the cache line in the higher level cache memory and write a value to the higher level cache hit counter field of the cache line to update the higher level cache hit counter. For example, as discussed herein, a value of a binary higher level cache hit counter may indicate a number of hits of the cache line in the higher level cache memory, and an increased value of the binary higher level cache hit counter may indicate a greater number of hits of the cache line in the higher level cache memory. The processing device may use any algorithms and/or operations to update the higher level cache hit counter of the cache line in the higher level cache memory.

After updating the higher level cache hit counter; in response to determining that the high locality indicator of the cache line is set (i.e., determination block 1402="Yes"); or in response to determining that the higher level cache hit counter exceeds the higher level cache locality threshold (i.e., determination block 1404="Yes"), the processing device may execute the cache access request for the cache line in the higher level cache memory in block 316 of the method 300 as described with reference to FIG. 3.

Figure 15:
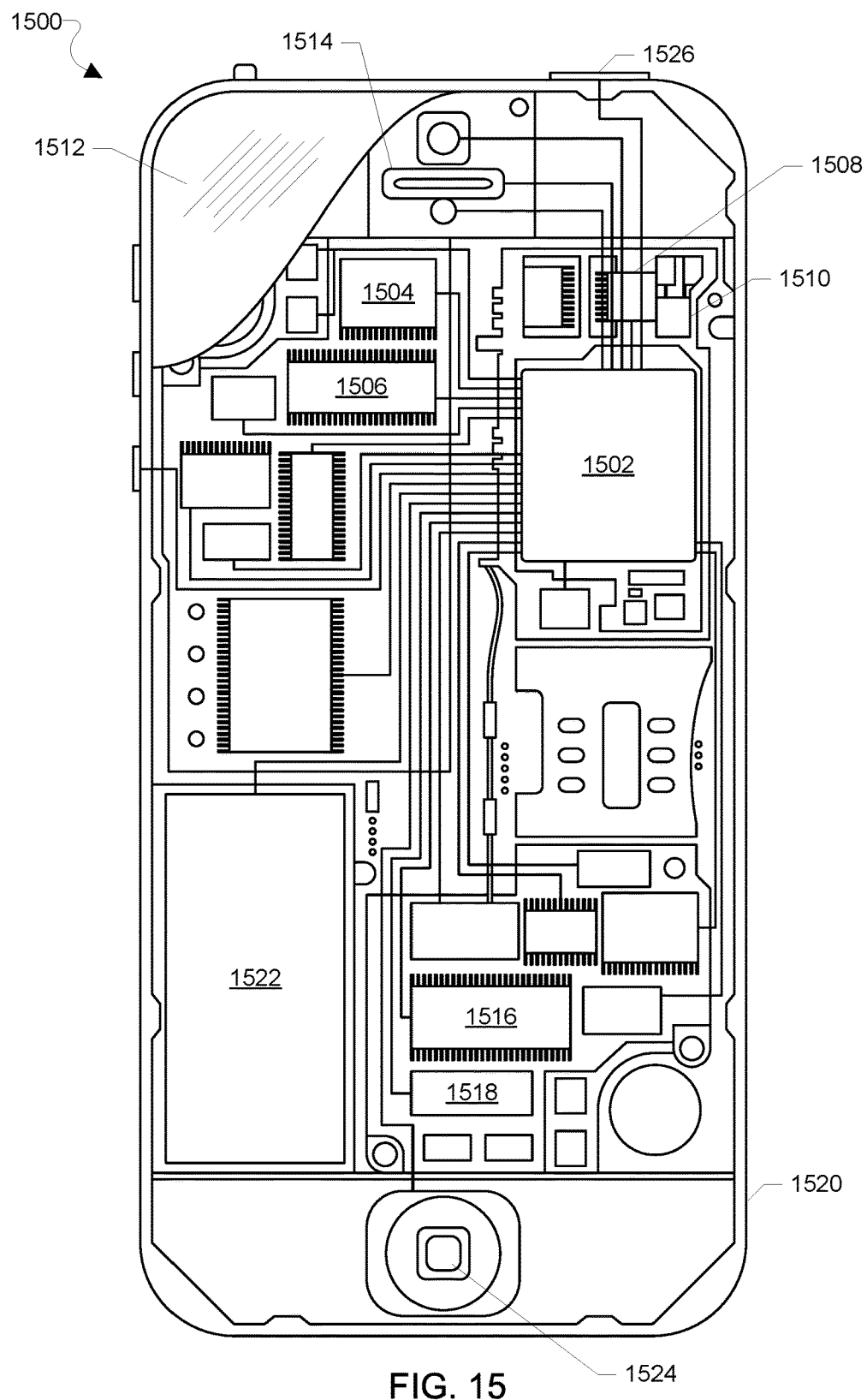
FIG. 15 is a component block diagram illustrating an example mobile computing device suitable for use with the various aspects.

The various aspects (including, but not limited to, aspects described above with reference to FIGS. 1-14) may be implemented in a wide variety of computing systems including mobile computing devices, an example of which suitable for use with the various aspects is illustrated in FIG. 15. The mobile computing device 1500 may include a processor 1502 coupled to a touchscreen controller 1504 and an internal memory 1506. The processor 1502 may be one or more multicore integrated circuits designated for general or specific processing tasks. The internal memory 1506 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1504 and the processor 1502 may also be coupled to a touchscreen panel 1512, such as a resistive-sensing touchscreen, capacitive-sensing touchscreen, infrared sensing touchscreen, etc. Additionally, the display of the computing device 1500 need not have touch screen capability.

The mobile computing device 1500 may have one or more radio signal transceivers 1508 (e.g., Peanut, Bluetooth, ZigBee, Wi-Fi, RF radio) and antennae 1510, for sending and receiving communications, coupled to each other and/or to the processor 1502. The transceivers 1508 and antennae 1510 may be used with the above-mentioned circuitry to implement the various wireless transmission protocol stacks and interfaces. The mobile computing device 1500 may include a cellular network wireless modem chip 1516 that enables communication via a cellular network and is coupled to the processor.

The mobile computing device 1500 may include a peripheral device connection interface 1518 coupled to the processor 1502. The peripheral device connection interface 1518 may be singularly configured to accept one type of connection, or may be configured to accept various types of physical and communication connections, common or proprietary, such as Universal Serial Bus (USB), FireWire, Thunderbolt, or PCIe. The peripheral device connection interface 1518 may also be coupled to a similarly configured peripheral device connection port (not shown).

The mobile computing device 1500 may also include speakers 1514 for providing audio outputs. The mobile computing device 1500 may also include a housing 1520, constructed of a plastic, metal, or a combination of materials, for containing all or some of the components described herein. The mobile computing device 1500 may include a power source 1522 coupled to the processor 1502, such as a disposable or rechargeable battery. The rechargeable battery may also be coupled to the peripheral device connection port to receive a charging current from a source external to the mobile computing device 1500. The mobile computing device 1500 may also include a physical button 1524 for receiving user inputs. The mobile computing device 1500 may also include a power button 1526 for turning the mobile computing device 1500 on and off.

Figure 16:
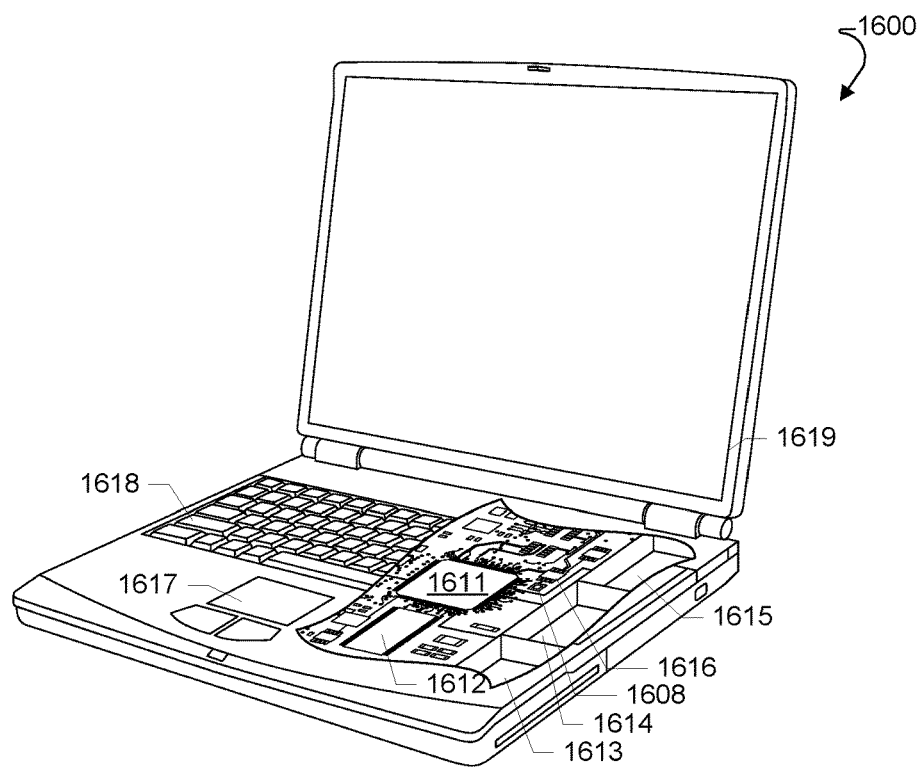
FIG. 16 is a component block diagram illustrating an example mobile computing device suitable for use with the various aspects.

The various aspects (including, but not limited to, aspects described above with reference to FIGS. 1-14) may be implemented in a wide variety of computing systems include a laptop computer 1600 an example of which is illustrated in FIG. 16. Many laptop computers include a touchpad touch surface 1617 that serves as the computer's pointing device, and thus may receive drag, scroll, and flick gestures similar to those implemented on computing devices equipped with a touch screen display and described above. A laptop computer 1600 will typically include a processor 1611 coupled to volatile memory 1612 and a large capacity nonvolatile memory, such as a disk drive 1613 of Flash memory.

Additionally, the computer 1600 may have one or more antenna 1608 for sending and receiving electromagnetic radiation that may be connected to a wireless data link and/or cellular telephone transceiver 1616 coupled to the processor 1611. The computer 1600 may also include a floppy disc drive 1614 and a compact disc (CD) drive 1615 coupled to the processor 1611. In a notebook configuration, the computer housing includes the touchpad 1617, the keyboard 1618, and the display 1619 all coupled to the processor 1611. Other configurations of the computing device may include a computer mouse or trackball coupled to the processor (e.g., via a USB input) as are well known, which may also be used in conjunction with the various aspects.

Figure 17:
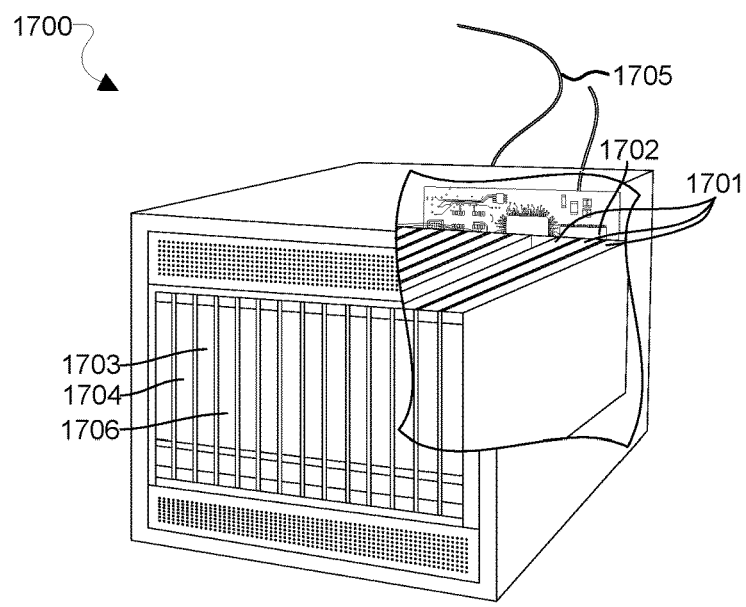
FIG. 17 is a component block diagram illustrating an example server suitable for use with the various aspects.

The various aspects (including, but not limited to, aspects described above with reference to FIGS. 1-14) may also be implemented in fixed computing systems, such as any of a variety of commercially available servers. An example server 1700 is illustrated in FIG. 17. Such a server 1700 typically includes one or more multicore processor assemblies 1701 coupled to volatile memory 1702 and a large capacity nonvolatile memory, such as a disk drive 1704. As illustrated in FIG. 17, multicore processor assemblies 1701 may be added to the server 1700 by inserting them into the racks of the assembly. The server 1700 may also include a floppy disc drive, compact disc (CD) or digital versatile disc (DVD) disc drive 1706 coupled to the processor 1701. The server 1700 may also include network access ports 1703 coupled to the multicore processor assemblies 1701 for establishing network interface connections with a network 1705, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects and implementations without departing from the scope of the claims. Thus, the present disclosure is not intended to be limited to the aspects and implementations described herein, but is to be accorded the widest scope consistent with the following claims and the principles and novel features disclosed herein.

What is claimed is:

1. A method of retaining high locality data in a higher level cache memory on a computing device, comprising:

receiving a cache access request for a first cache line, wherein the first cache line is located in the higher level cache memory and wherein the cache access request indicates a locality of the first cache line;
determining whether the cache access request indicating the locality of the first cache line indicates that the first cache line has high locality; and
setting a high locality indicator of the first cache line in the higher level cache memory in response to determining that the cache access request indicates that the first cache line has high locality.

2. The method of claim 1, further comprising:
selecting the first cache line as a victim cache line candidate;
determining whether the high locality indicator of the first cache line is set;
evicting the first cache line in response to determining that the high locality indicator of the first cache line is not set; and
selecting a second cache line as the victim cache line candidate in response to determining that the high locality indicator of the first cache line is set.

3. The method of claim 1, further comprising:
determining whether to promote the first cache line to having high locality in response to determining that the cache access request indicates that the first cache line has high locality, wherein setting a high locality indicator of the first cache line in the higher level cache memory comprises setting the high locality indicator of the first cache line in the higher level cache memory in response to determining to promote the first cache line to having high locality; and
resetting the high locality indicator of the first cache line in the higher level cache memory in response to determining to not promote the first cache line to having high locality.

4. The method of claim 1, further comprising determining whether promoting the first cache line to having high locality exceeds a cache set promote threshold in response to determining that the cache access request indicates that the first cache line has high locality,
wherein setting a high locality indicator of the first cache line in the higher level cache memory comprises setting the high locality indicator of the first cache line in the higher level cache memory in response to determining that promoting the first cache line to having high locality does not exceed the cache set promote threshold.

5. The method of claim 4, further comprising resetting a high locality indicator of a second cache line in the higher level cache memory in response to determining that promoting the first cache line to having high locality exceeds the cache set promote threshold.

6. The method of claim 5, further comprising determining whether a high locality counter for the higher level cache memory exceeds a demote threshold,
wherein resetting a high locality indicator of a second cache line in the higher level cache memory comprises resetting the high locality indicator of the second cache line in the higher level cache memory in response to determining that the high locality counter for the higher level cache memory exceeds the demote threshold.

7. The method of claim 1, further comprising:
determining whether a cache line high locality counter exceeds a cache line demote threshold; and
resetting the high locality indicator of the first cache line in the higher level cache memory in response to determining that the cache line high locality counter exceeds the cache line demote threshold.

8. The method of claim 1, further comprising resetting the high locality indicator of the first cache line in the higher level cache memory in response to determining that the cache access request does not indicate the first cache line has high locality.

9. A computing device, comprising:
a processor;
a higher level cache memory;
a lower level cache memory; and
a cache memory manager communicatively connected to the processor, the higher level cache memory, and the lower level cache memory, and configured to perform operations comprising:
receiving a cache access request for a first cache line, wherein the first cache line is located in the higher level cache memory and wherein the cache access request indicates a locality of the first cache line;
determining whether the cache access request indicating the locality of the first cache line indicates that the first cache line has high locality; and
setting a high locality indicator of the first cache line in the higher level cache memory in response to determining that the cache access request indicates that the first cache line has high locality.

10. The computing device of claim 9, wherein the cache memory manager is configured to perform operations further comprising:
selecting the first cache line as a victim cache line candidate;
determining whether the high locality indicator of the first cache line is set;
evicting the first cache line in response to determining that the high locality indicator of the first cache line is not set; and
selecting a second cache line as the victim cache line candidate in response to determining that the high locality indicator of the first cache line is set.

11. The computing device of claim 9, wherein the cache memory manager is configured to perform operations further comprising:
determining whether to promote the first cache line to having high locality in response to determining that the cache access request indicates that the first cache line has high locality, wherein setting a high locality indicator of the first cache line in the higher level cache memory comprises setting the high locality indicator of the first cache line in the higher level cache memory in response to determining to promote the first cache line to having high locality; and
resetting the high locality indicator of the first cache line in the higher level cache memory in response to determining to not promote the first cache line to having high locality.

12. The computing device of claim 9, wherein the cache memory manager is configured to perform operations further comprising determining whether promoting the first cache line to having high locality exceeds a cache set promote threshold in response to determining that the cache access request indicates that the first cache line has high locality,
wherein the cache memory manager is configured to perform operations such that setting a high locality indicator of the first cache line in the higher level cache memory comprises setting the high locality indicator of the first cache line in the higher level cache memory in response to determining that promoting the first cache line to having high locality does not exceed the cache set promote threshold.

13. The computing device of claim 12, wherein the cache memory manager is configured to perform operations further comprising resetting a high locality indicator of a second cache line in the higher level cache memory in response to determining that promoting the first cache line to having high locality exceeds the cache set promote threshold.

14. The computing device of claim 13, wherein the cache memory manager is configured to perform operations further comprising determining whether a high locality counter for the higher level cache memory exceeds a demote threshold,
wherein the cache memory manager is configured to perform operations such that resetting a high locality indicator of a second cache line in the higher level cache memory comprises resetting the high locality indicator of the second cache line in the higher level cache memory in response to determining that the high locality counter for the higher level cache memory exceeds the demote threshold.

15. The computing device of claim 9, wherein the cache memory manager is configured to perform operations further comprising:
    determining whether a cache line high locality counter exceeds a cache line demote threshold;
    resetting the high locality indicator of the first cache line in the higher level cache memory in response to determining that the cache line high locality counter exceeds the cache line demote threshold; and
    resetting the high locality indicator of the first cache line in the higher level cache memory in response to determining that the cache access request does not indicate the first cache line has high locality.

\* \* \* \* \*